(12) United States Patent
Kato

(10) Patent No.: US 7,748,302 B2
(45) Date of Patent: Jul. 6, 2010

(54) WORKPIECE EXCHANGING APPARATUS AND LATHE UNIT

(75) Inventor: Heizaburo Kato, Shizuoka (JP)

(73) Assignee: Sankyo Seisakusho Co., Tokyo (JP)

( * ) Notice: Subject to any disclaimer, the term of this patent is extended or adjusted under 35 U.S.C. 154(b) by 407 days.

(21) Appl. No.: 11/897,426

(22) Filed: Aug. 30, 2007

(65) Prior Publication Data

US 2008/0069680 A1    Mar. 20, 2008

(30) Foreign Application Priority Data

Aug. 31, 2006 (JP) .............................. 2006-236473

(51) Int. Cl.
*B23B 13/10* (2006.01)
*B23B 15/10* (2006.01)

(52) U.S. Cl. ......................................... 82/124; 82/117

(58) Field of Classification Search .................. 82/117, 82/124, 126, 127
See application file for complete search history.

(56) References Cited

U.S. PATENT DOCUMENTS

| | | | | |
|---|---|---|---|---|
| 4,116,094 A | * | 9/1978 | Dombrowski et al. | 82/104 |
| 4,293,268 A | * | 10/1981 | Mink | 414/591 |
| 4,302,144 A | * | 11/1981 | Hallqvist | 414/590 |
| 4,445,405 A | * | 5/1984 | Champeau et al. | 82/124 |
| 4,492,512 A | * | 1/1985 | Mink | 414/744.3 |
| 6,044,735 A | * | 4/2000 | Crippa | 82/124 |
| 2002/0035881 A1 | | 3/2002 | Kato | |
| 2002/0043126 A1 | | 4/2002 | Kato | |
| 2003/0114282 A1 | | 6/2003 | Kato | |

FOREIGN PATENT DOCUMENTS

| EP | 1 317 992 | 6/2003 |
|---|---|---|
| EP | 1317992 A2 | 6/2003 |
| JP | 63-102850 A | 5/1988 |
| JP | 63 102850 A | 5/1988 |
| JP | 2003 080430 A | 3/2003 |
| JP | 2003-080430 A | 3/2003 |
| TW | 502095 B | 9/2002 |
| TW | 524940 B | 3/2003 |
| TW | 544362 B | 8/2003 |

OTHER PUBLICATIONS

Chinese Office Action issued on Jan. 9, 2009 (along with English translation).
European Examination Report Issued Jun. 23, 2008 in counterpart European application of this application.

(Continued)

*Primary Examiner*—Will Fridie, Jr.
(74) *Attorney, Agent, or Firm*—Nutter McClennen & Fish LLP; John J. Penny, Jr.

(57) ABSTRACT

A workpiece exchanging apparatus for exchanging a machined workpiece with an unmachined workpiece is provided, the workpiece exchanging apparatus including a gripping arm provided at its two longitudinal end sections with gripping sections for gripping, respectively, a machined workpiece and an unmachined workpiece, the gripping arm being able to turn around a turn axis that is positioned at a longitudinal center section of the gripping arm and being able to move linearly in the axial direction of that turn axis; a first cam mechanism for making the gripping arm turn; and a second cam mechanism for making the gripping arm linearly move.

8 Claims, 16 Drawing Sheets

OTHER PUBLICATIONS

English Language Translation of Chinese Office Action issued on Jun. 26, 2009 in counterpart Patent Application No. 200710148316.5 and Chinese Office Action.

European Search Report (dated Nov. 15, 2007).

Taiwanese Office Action of Jan. 14, 2010 and its English translation.

* cited by examiner

WORKPIECE EXCHANGING APPARATUS AND LATHE UNIT

CROSS-REFERENCE TO RELATED APPLICATIONS

The present application claims priority upon Japanese Patent Application No. 2006-236473 filed on Aug. 31, 2006, which is herein incorporated by reference.

BACKGROUND

1. Technical Field

The present invention relates to workpiece exchanging apparatuses for exchanging a machined workpiece with a workpiece yet to be machined, and to lathe units including such a workpiece exchanging apparatus as well as a lathe.

2. Related Art

In machining operations in which a workpiece is machined with a workpiece machining apparatus, such as a lathe, there is a demand to shorten times for exchanging a workpiece that has been machined by the workpiece machining apparatus with an unmachined workpiece, in order to make the workpiece machining operation more efficient. Accordingly, for example workpiece transport devices, such as loaders, and handling robots have been developed as workpiece exchanging apparatuses for retrieving a machined workpiece from the workpiece machining apparatus and presenting an unmachined workpiece to the workpiece machining apparatus (see for example JP-A-07-266184).

However, there is a tendency that such workpiece exchanging apparatuses are becoming larger or more expensive, and as a result, it is difficult to shorten the workpiece exchange time.

SUMMARY

An advantage of some aspects of the present invention is that it is possible to achieve a workpiece exchanging apparatus that has a simple configuration and with which machined workpieces and unmachined workpieces can be exchanged quickly.

A main aspect of the present invention is a workpiece exchanging apparatus for exchanging a machined workpiece with an unmachined workpiece, the workpiece exchanging apparatus comprising: a gripping arm provided at its two longitudinal end sections with gripping sections for gripping, respectively, a machined workpiece and an unmachined workpiece, the gripping arm being able to turn around a turn axis that is positioned at a longitudinal center section of the gripping arm and being able to move linearly in the axial direction of that turn axis; a first cam mechanism for making the gripping arm turn; and a second cam mechanism for making the gripping arm linearly move.

Further features and aspects of the present invention shall become clear from the description and the accompanying drawings.

DESCRIPTION OF EXEMPLARY EMBODIMENTS

Figure 1:
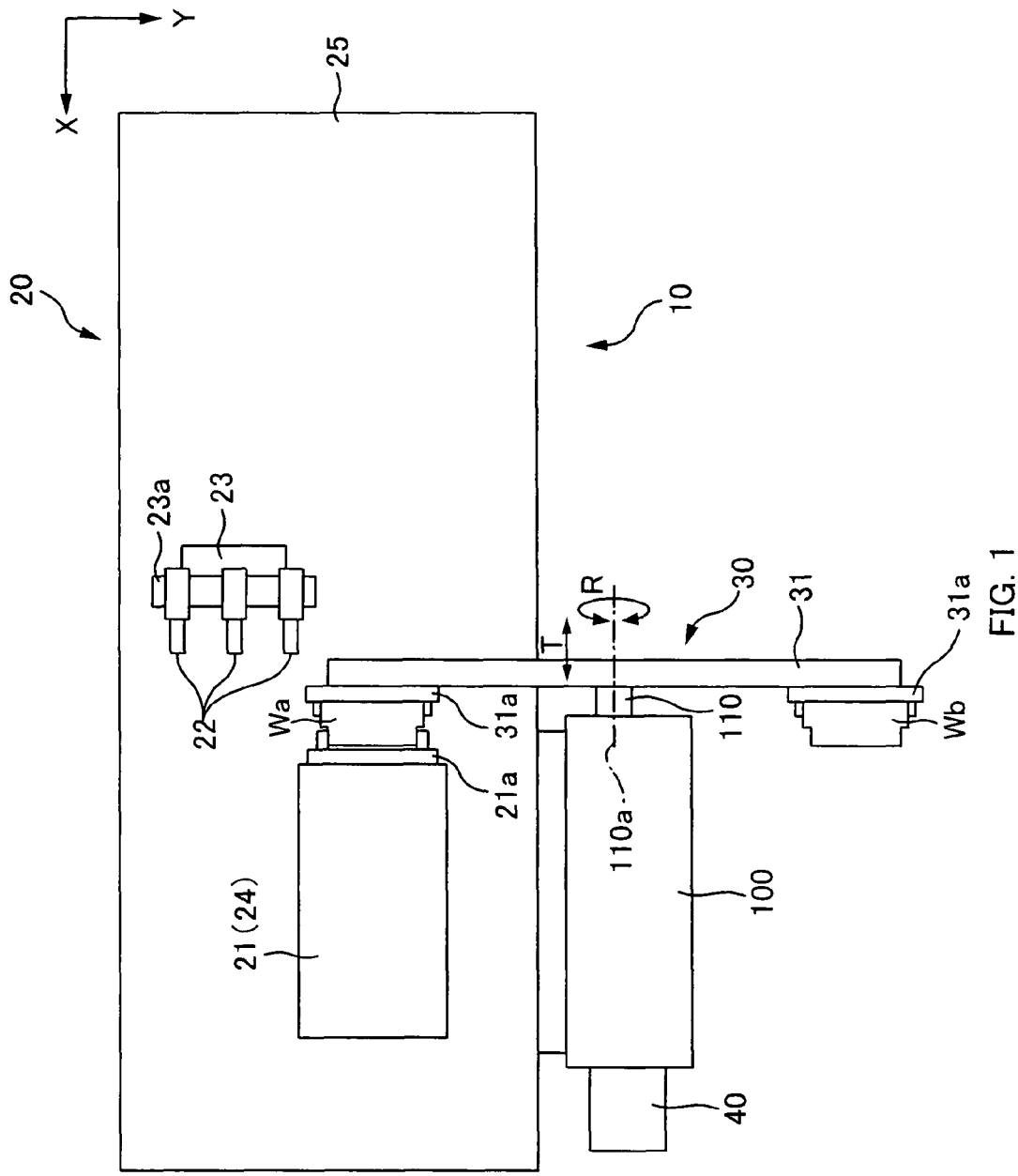
FIG. 1 is a diagrammatic view of a lathe unit 10.

At least the following aspects shall become clear from the description and the accompanying drawings.

A workpiece exchanging apparatus for exchanging a machined workpiece with an unmachined workpiece is provided, the workpiece exchanging apparatus comprising a gripping arm provided at its two longitudinal end sections with gripping sections for gripping, respectively, a machined workpiece and an unmachined workpiece, the gripping arm being able to turn around a turn axis that is positioned at a longitudinal center section of the gripping arm and being able to move linearly in the axial direction of that turn axis, a first cam mechanism for making the gripping arm turn, and a second cam mechanism for making the gripping arm linearly move.

With such a workpiece exchanging apparatus, it is possible to exchange a machined workpiece and an unmachined workpiece quickly with a simple mechanical configuration that can be realized by cam mechanisms.

The gripping arm may perform an operation in which the gripping arm moves linearly from a standby position of the gripping arm to a workpiece handover position for handing over the machined workpiece and the unmachined workpiece, in order for the gripping sections to grip the machined workpiece and the unmachined workpiece, an operation in which the gripping arm moves linearly from the workpiece handover position to a workpiece withdrawal position for withdrawing the machined workpiece and the unmachined workpiece received at the workpiece handover position, an operation in which the gripping arm turns such that the positions of the machined workpiece and the unmachined workpiece gripped by the gripping sections are swapped, an operation in which the gripping arm moves linearly from the workpiece withdrawal position to the workpiece handover position, in order for the gripping sections to release the machined workpiece and the unmachined workpiece, and an operation in which the gripping arm moves linearly in order to return from the workpiece handover position to the standby position.

In this case, the gripping sections are able to simultaneously grip or release the machined workpiece and the unmachined workpiece at the workpiece handover position. As a result it is possible to exchange the machined workpiece and the unmachined workpiece even quicker.

The workpiece exchanging apparatus may further include a support shaft supporting the gripping arm such that the central axis of the support shaft coincides with the turn axis, the support shaft turning around the central axis together with the gripping arm and moving linearly in the axial direction of the central axis together with the gripping arm.

In this case, the first cam mechanism and the second cam mechanism drive the gripping arm via the support shaft.

The workpiece exchanging apparatus may further include a rotatably supported drive shaft, the drive shaft driving the first cam mechanism and the second cam mechanism by rotating, and a housing containing the first cam mechanism, the second cam mechanism, the support shaft and the drive shaft.

In this case, the housing can be made compact, because the first cam mechanism and the second cam mechanism are driven by the same drive shaft. Moreover, it becomes easy to synchronize the driving of the first cam mechanism and the driving of the second cam mechanism, so that it becomes possible to exchange the machined workpiece and the unmachined workpiece even quicker.

Furthermore, the first cam mechanism may include a first cam that is supported by the drive shaft and that can rotate together with the drive shaft, and a first cam follower that is supported by the support shaft and that makes the support shaft turn by engaging with the first cam as the first cam rotates, and the second cam mechanism may include a second cam that is supported by the drive shaft together with the first cam and that can rotate together with the drive shaft, and a pivot arm that has at one end section in its longitudinal direction a second cam follower that engages with the second cam and that is pivotable by the rotation of the second cam, and a biasing member that engages with the other longitudinal end section of the pivot arm and that biases the support shaft to cause the support shaft to move linearly as the pivot arm pivots.

Furthermore, the biasing member may include a tubular section that makes a small diameter section of the support shaft fit inside thereof, and an engagement section adjacent to that end section that is further removed from the gripping arm, of the two longitudinal end sections of the tubular section, and having an engagement hole for engaging with the other longitudinal end section of the pivot arm, and when the pivot arm pivots, the tubular section biases the support shaft as the engagement section and the tubular section move linearly in the axial direction of the central axis of the support shaft.

If such a biasing member is used, then it becomes possible to make the housing more compact, because the space for attaching the biasing member is reduced.

Furthermore, with respect to the linear movement direction of the gripping arm, the standby position may be closer to the workpiece handover position than the workpiece withdrawal position.

In this case, the amount of movement when the gripping arm moves linearly is reduced, so that a machined workpiece and an unmachined workpiece can be exchanged even quicker.

Furthermore, when the gripping arm reaches the workpiece handover position during the operation in which the gripping arm moves linearly in order to return from the workpiece withdrawal position to the workpiece handover position, the gripping arm first may retract from the workpiece handover position, and then the gripping arm may advance towards the workpiece handover position and again reaches the workpiece handover position.

In this case, deviations of the unmachined workpiece that occur when the gripping arm gripping the unmachined workpiece reaches the workpiece handover position are reduced, and the unmachined workpiece is suitably handed over at the workpiece handover position.

Furthermore, a lathe unit can be realized that includes (A) a lathe for machining a workpiece, and (B) a workpiece exchanging apparatus for exchanging a machined workpiece that has been machined with the lathe with an unmachined workpiece, the workpiece exchanging apparatus including a gripping arm provided at its two longitudinal end sections with gripping sections for gripping, respectively, a machined workpiece and an unmachined workpiece, the gripping arm being able to turn around a turn axis that is positioned at a longitudinal center section of the gripping arm and being able to move linearly in the axial direction of that turn axis; a first cam mechanism for making the gripping arm turn; and a second cam mechanism for making the gripping arm linearly move.

With this lathe unit, a machined workpiece that has been machined with the lathe and an unmachined workpiece can be exchanged quickly.

Outline of Lathe Unit

Figure 2:
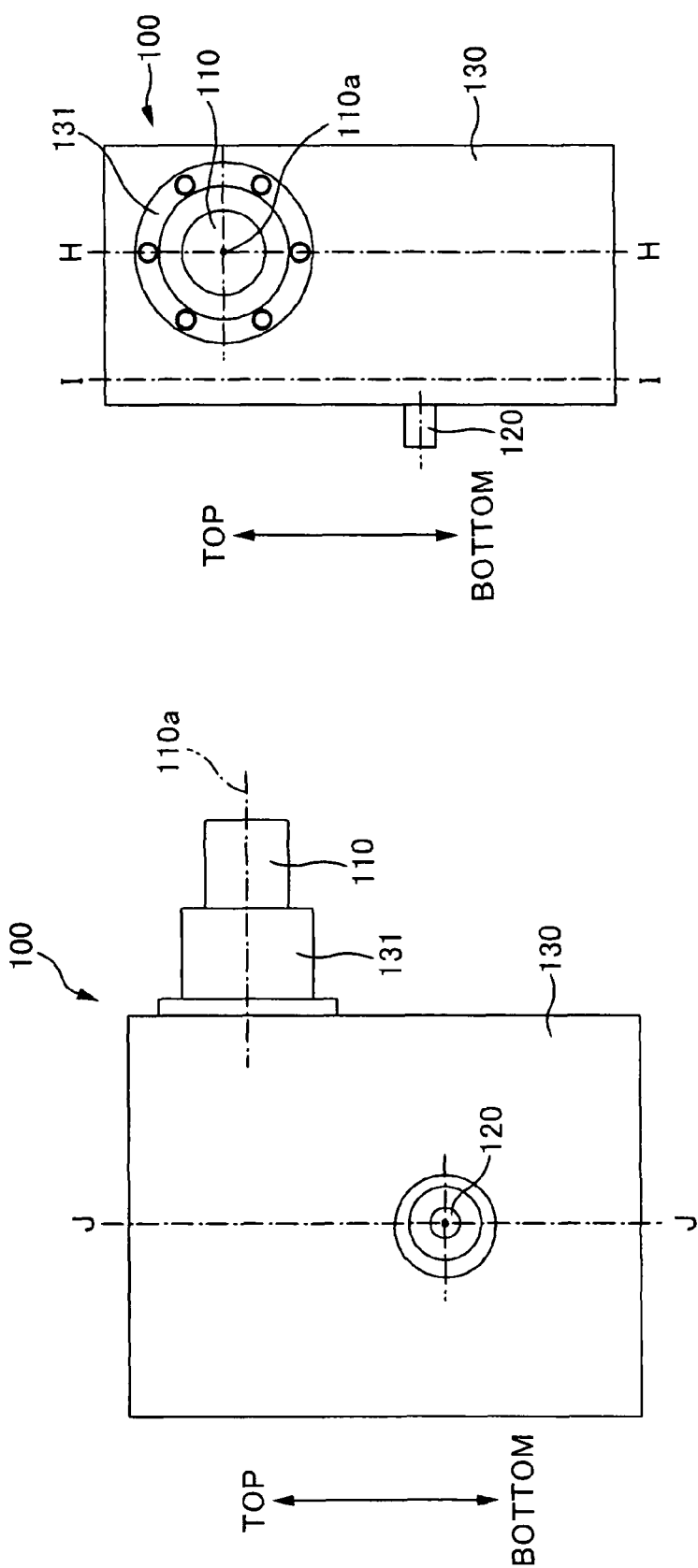
FIG. 2 is a schematic view of the external appearance of a cam unit 100.

Referring to FIGS. 1 and 2, the following is an explanation of a lathe unit 10, which is a workpiece machining apparatus using a workpiece exchanging apparatus. FIG. 1 shows an overview of the lathe unit 10 and is a view of the lathe unit 10 taken from above. FIG. 2 is a schematic view of the outer appearance of a cam unit 100, and shows a front view (right drawing) of the cam unit 100 and a side view (left diagram) of the cam unit 100. It should be noted that in FIG. 1, the arrows denote the X-axis and the Y-axis, whereas in FIG. 2, the arrows denote the top side and the bottom side of the cam unit 100.

In the present embodiment, as shown in FIG. 1, the lathe unit 10 includes at least a lathe 20 for machining a workpiece, and an automatic workpiece exchanging apparatus (so-called "automatic workpiece changer", also referred to in short as "AWC 30" below), which is an example of a workpiece exchanging apparatus for exchanging a machined workpiece Wa that has been machined with the lathe 20 with an unmachined workpiece Wb.

The lathe 20 is a numerically controlled (NC) lathe and can perform complex workpiece machining operations, including such as turning operations and milling operations. As shown in FIG. 1, the lathe 20 includes a main shaft 21, which is supported rotatably by a headstock 24, tools 22 that cut the workpiece, a tool holder 23 that holds the tools 22 via a turntable 23*a*, and a base 25 that supports the main shaft 21, the tool holder 23 and the like. Moreover, a lathe-side chuck 21*a* for gripping the workpiece is provided at the front end of the main shaft 21. This lathe-side chuck 21*a* performs the operations of gripping (clamping) the workpiece and of releasing (unclamping) the gripped workpiece, and rotates together with the main shaft 21, as the main shaft 21 rotates. Moreover, the clamping and unclamping operations of the lathe-side chuck 21*a* are controlled by control signals from a control device, which is described later. Furthermore, the tool holder 23 can move with respect to the base 25 in the X-axis direction, the Y-axis direction, and the Z-axis direction, which is perpendicular to the X-axis and the Y-axis (perpendicular to the paper plane of FIG. 1).

A lathe 20 with such a configuration machines workpieces based on control signals from the control device (that is to say, it fabricates a machined workpiece Wa from an unmachined workpiece Wb). More specifically, when the lathe-side chuck 21*a* gripping the unmachined workpiece Wb rotates together with the main shaft 21, the tool holder 23 is moved based on the control signals, and by abutting the tool 22 held by the tool holder 23 at a suitable position against the unmachined workpiece Wb, the portion of the unmachined workpiece Wb against which the tool 22 is abutted is machined by cutting.

It should be noted that in this embodiment, as shown in FIG. 1, the shape of the unmachined workpiece Wb is that of a member having two columnar sections of different outer diameter that are lined up on the same axis. Moreover, for the sake of explanation, it is assumed that the outer diameter of the two columnar sections before and after the machining with the lathe 20 does not change. That is to say, the machined workpiece Wa, like the unmachined workpiece Wb, has different outer diameters along the center axis direction of the machined workpiece. In the following, the section with the smaller outer diameter of the machined workpiece Wa and the unmachined workpiece Wb is referred to as "small diameter section", whereas the section with the larger outer diameter is referred to as "large diameter section."

The AWC 30 is a peripheral device of the lathe 20 that retrieves the machined workpiece Wa from the lathe 20 when the machined workpiece Wa has been fabricated by the lathe 20, and presents an unmachined workpiece Wb to the lather 20. As shown in FIG. 1, the AWC 30 is arranged parallel to the lathe 20, and includes a gripping arm 31, a cam unit 100, and a drive motor 40.

The gripping arm 31 is provided at both its longitudinal end sections with chucks 31*a*, which are an example of a gripping section for gripping the machined workpiece Wa and the unmachined workpiece Wb. In other words, the gripping arm 31 according to the present embodiment includes two chucks 31*a*. Furthermore, as shown in FIG. 1, the two chucks 31*a* are fastened to that side, of the two sides in X-axis direction of the gripping arm 31, which is closer to the main shaft 21 of the lathe 20 and the cam unit 100. Moreover, also the chucks 31*a*, like the lathe-side chuck 21*a* perform a clamping operation and an unclamping operation, and the clamping and unclamping operations are controlled by control signals from the control device.

Furthermore, the central longitudinal section of the gripping arm 31 is supported by the front end of a support shaft 110, with which the cam unit 100 is provided. Moreover, the gripping arm 31 can turn around a turn axis that is located at the center section with respect to its longitudinal direction (that is, in the turn direction marked by the letter "R" in FIG. 1). Furthermore, the gripping arm 31 can be linearly extended and retracted in the axial direction of the turn axis (that is, in the direction marked by the letter "T" in FIG. 1). The gripping arm 31 performs a turn operation and a linear extension/retraction operation in order to exchange the machined workpiece Wa with an unmachined workpiece Wb. It should be noted that the turn operation and the linear extension/retraction operation of the gripping arm 31 are explained later in the section "Operation Example of the Lathe Unit".

The cam unit 100 is a device for driving the gripping arm 31 and, as shown in FIG. 2, is provided with a support shaft 110. Inside, the cam unit 100 is provided with a plurality of cam mechanisms for driving the gripping arm 31 and a drive shaft 120 for transmitting driving power to the plurality of cam mechanisms. In the present embodiment, when the plurality of cam mechanisms are driven, the driving force for turning the gripping arm 31 and the driving force for linearly moving the gripping arm 31 are transmitted to the gripping arm 31 via the support shaft 110. More specifically, the support shaft 110 turns together with the gripping arm 31 around a central axis 110*a* of the support shaft 110 and moves linearly in the axial direction of the central axis 110*a*, as the plurality of cam mechanisms are driven. Therefore, the central axis 110*a* of the support shaft 110 serves as a turn axis of the gripping arm 31. That is to say, the gripping arm 31 is driven by driving the support shaft 110 with the plurality of cam mechanisms. It should be noted that details regarding the configuration of the cam unit 100 are explained later in the section "Configuration Example of Cam Unit".

The drive motor 40 is the driving source of the cam unit 100, and the rotation of the drive motor 40 is transmitted to the driving shaft 120 through a driving force transfer mechanism (for example a gear mechanism including hypoid gears or the like), which is not shown in the drawings, thereby driving the plurality of cam mechanisms.

With such an AWC 30, when the drive motor 40 is started by a control signal from the control device, the cam unit 100 is driven, and the gripping arm 31 performs a turn operation and a linear extension/retraction operation. Through this series of operations of the gripping arm 31, the machined workpiece Wa is retrieved from the lathe 20 and the unmachined workpiece Wb is retrieved from a workpiece storage space (the place where the unmachined workpieces Wb are located in FIG. 1), the workpieces are transported by the gripping arm 31, and ultimately, the unmachined workpiece Wb is placed in the lathe 20, whereas the machined workpiece Wa is placed in the workpiece storage. That is to say, each time the gripping arm 31 performs this series of operations at each cycle, one workpiece exchange is performed by the AWC 30.

Needless to say, when the lathe unit 10 is started, no machined workpiece Wa has been fabricated yet, so that the gripping arm 31 of the AWC 30 retrieves only an unmachined workpiece Wb from the workpiece storage space, transports it and presents the unmachined workpiece Wb to the lathe 20. On the other hand, after all workpieces have been machined and the lathe unit 10 stops, the gripping arm 31 retrieves only the machined workpiece Wa from the lathe 20, transports it, and places the machined workpiece Wa in the workpiece storage space. That is to say, at the start and stop of the lathe unit 10, no workpiece exchange is carried out by the AWC 30. It should be noted that the operation of the AWC 30 is explained later in the section "Operation Example of the Lathe Unit".

Moreover, the lathe unit 10 according to the present embodiment is provided with a control device (also referred to as "NC device"), which is not shown in the drawings, in order to control the lathe 20 and the AWC 30. This control device includes a CPU and a memory in which a numerical control program is stored, and controls the various sections of the lathe unit 10 through this numerical control program. As mentioned above, the lathe 20 carries out the workpiece machining and the AWC 30 carries out the workpiece exchange based on control signals that are sent from the control device. In other words, in the lathe unit 10 according to the present embodiment, the workpiece machining and the workpiece exchange are controlled automatically.

Moreover, in order to prevent oil or shavings produced by the lathe 20 from scattering in the workpiece storage space, the lathe unit 10 according to the present embodiment is provided with a shutter (not shown in the drawings) for compartmentalizing the workpiece storage space and the lathe unit 10. When this shutter is open, the gripping arm 31 of the AWC 30 can enter into the workpiece storage space. Also the opening and closing operation of the shutter is controlled with control signals from the control device.

Configuration Example of Cam Unit

Figure 3:
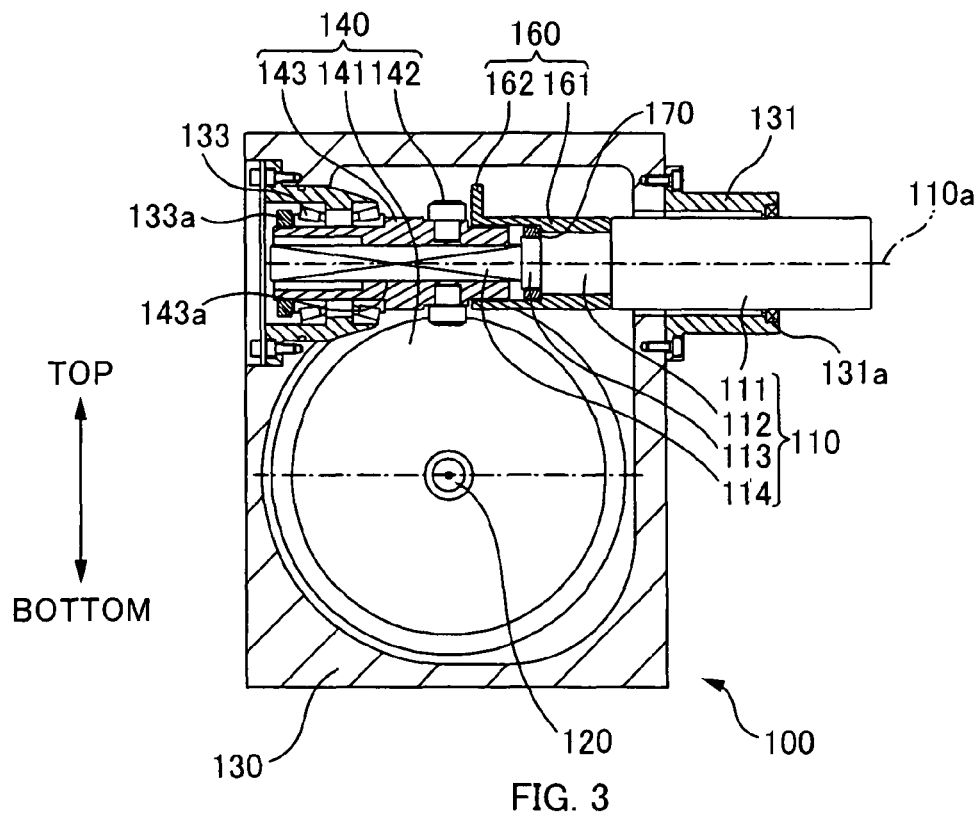
FIG. 3 is a sectional view of the cam unit 100, taken along the section plane H-H in FIG. 2.
Figure 4:
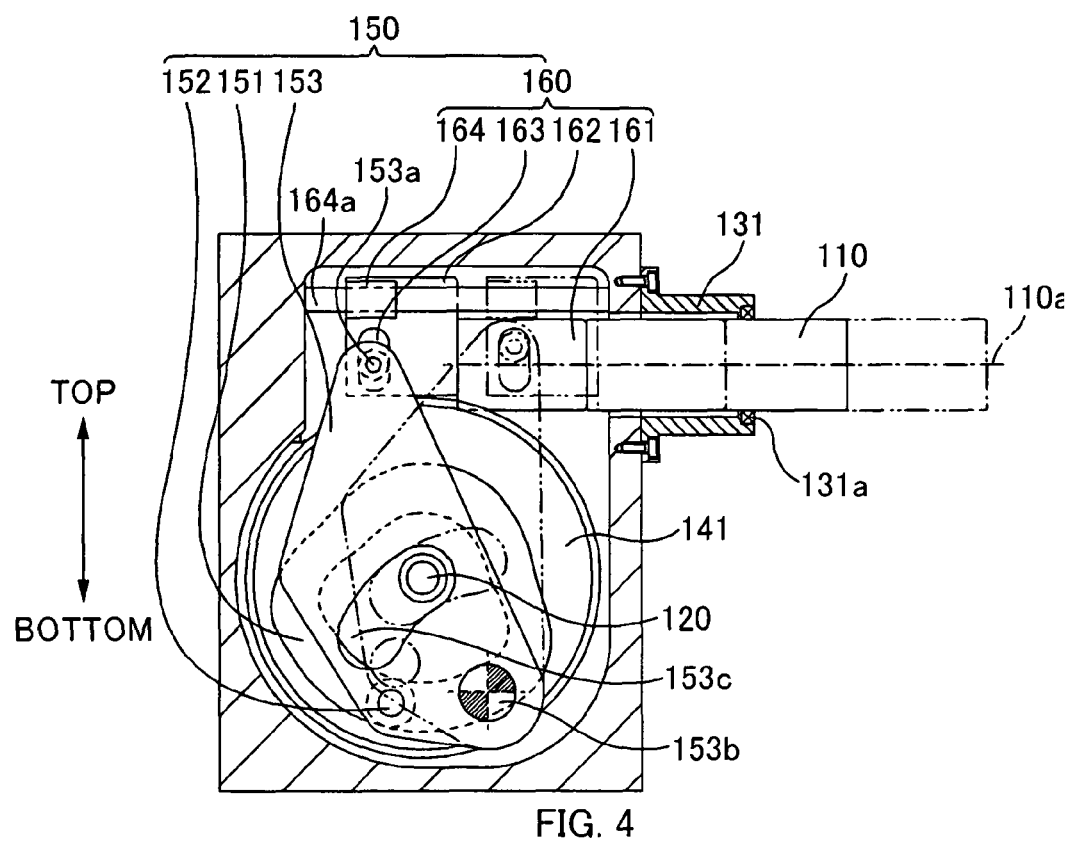
FIG. 4 is a sectional view of the cam unit 100, taken along the section plane I-I in FIG. 2.
Figure 5:
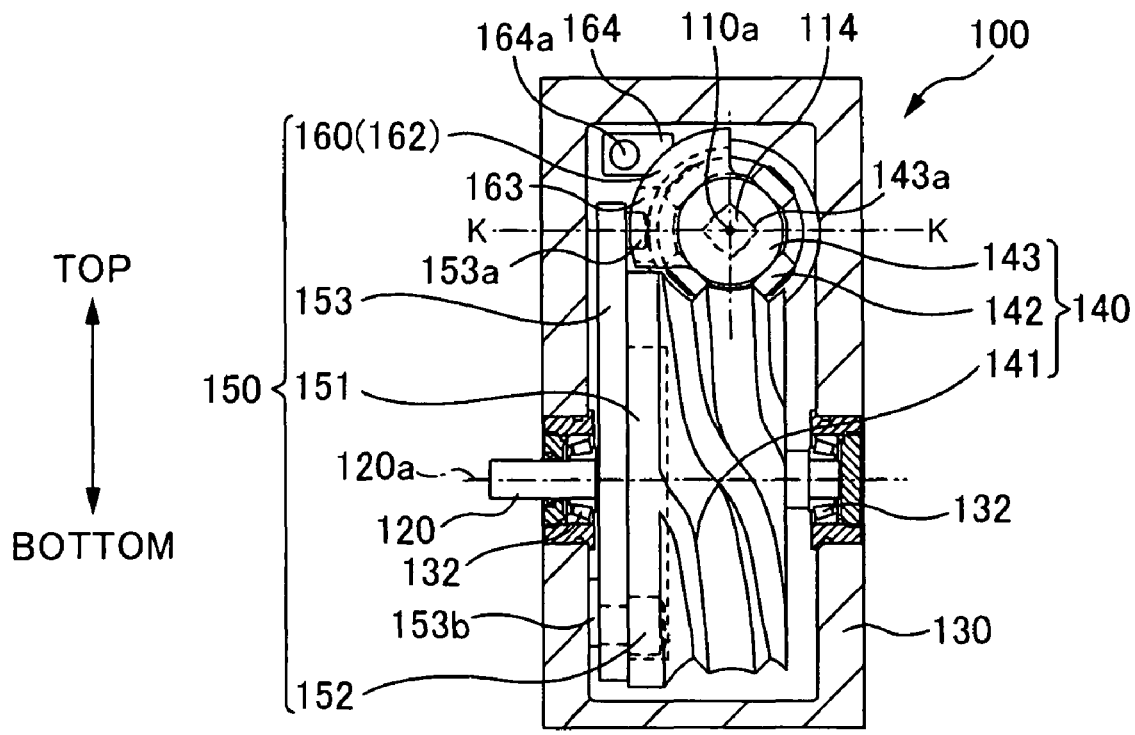
FIG. 5 is a sectional view of the cam unit 100, taken along the section plane J-J in FIG. 2.
Figure 6:
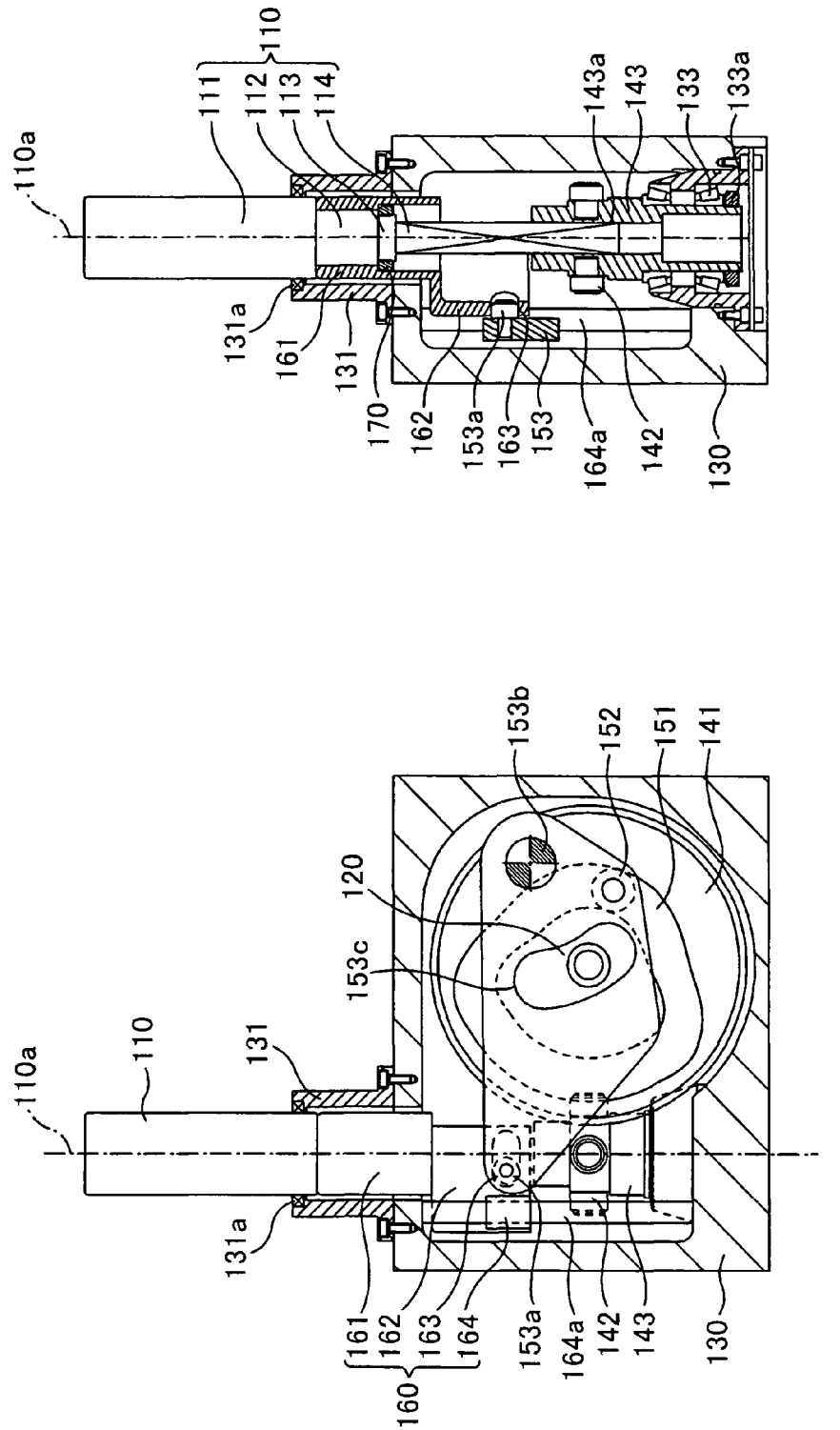
FIG. 6 is a section along I-I in FIG. 2A and a section along K-K in FIG. 5 when the support shaft 110 has reached one end of the linear movement range of the support shaft 110.
Figure 7:
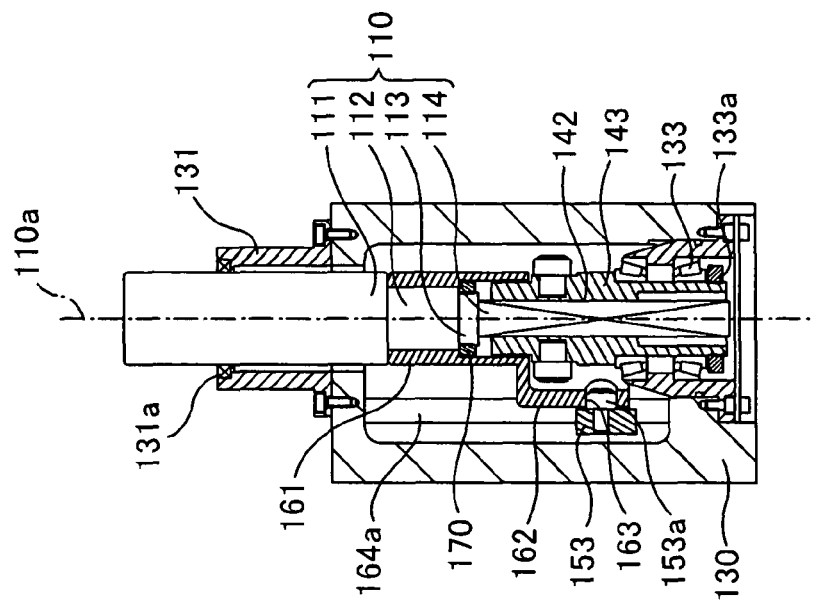
FIG. 7 is a section along I-I in FIG. 2A and a section along K-K in FIG. 5 when the support shaft 110 has reached the other end of the linear movement range of the support shaft 110.
Figure 7:
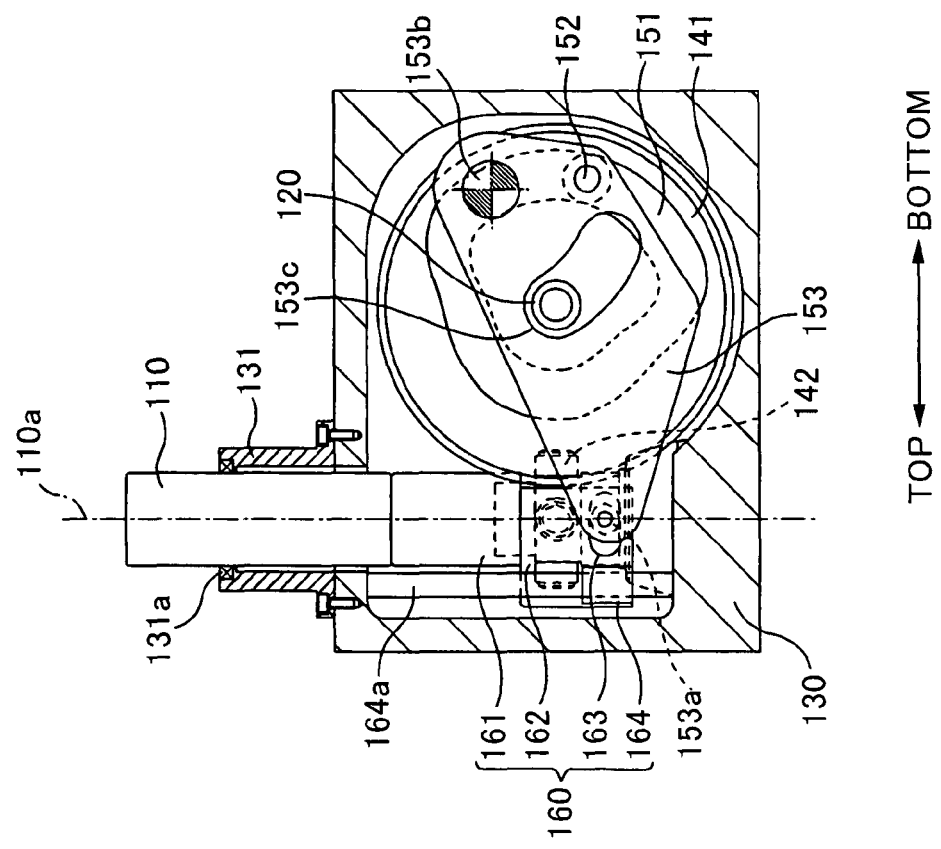
Figure 8:
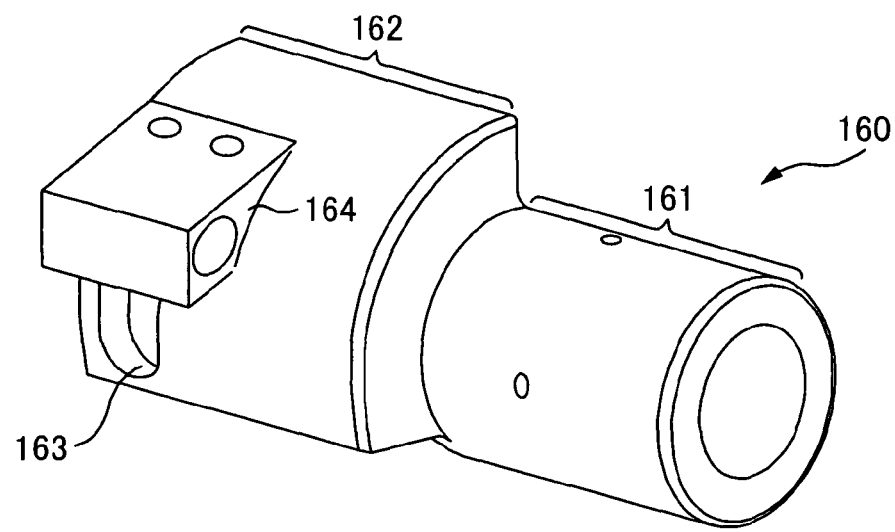
FIG. 8 is a perspective view schematically showing the external appearance of the biasing member 160.
Figure 9:
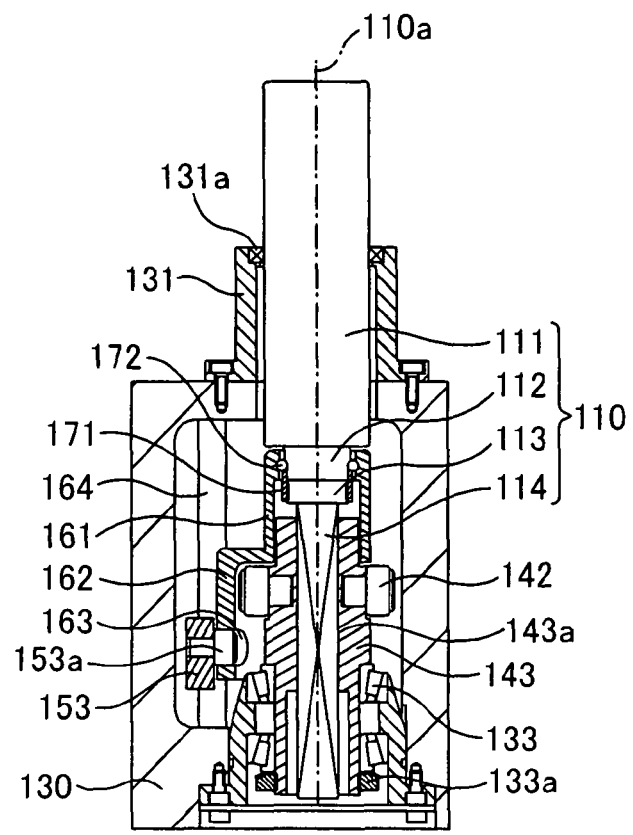
FIG. 9 is a diagram showing another example of a holding member holding the biasing member 160.
Figure 10:
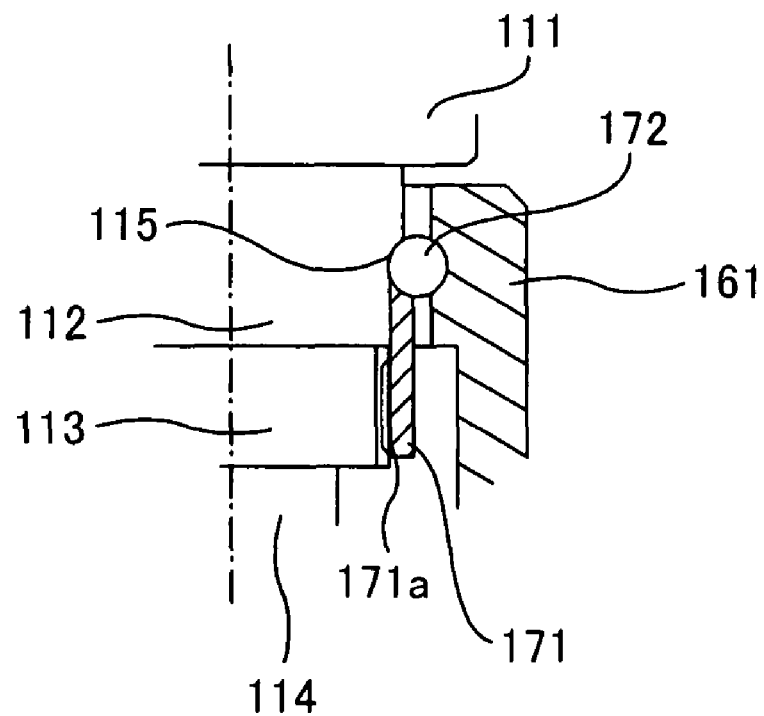
FIG. 10 is an enlarged view of the vicinity of the holding member 171 in FIG. 9.

The following is an explanation of a configuration example of the cam unit 100 according to the present embodiment, with reference to FIGS. 3 to 10. FIG. 3 is a schematic view of a section along the line H-H in FIG. 2 described above. FIG. 4 is a schematic view of a section along the line I-I in FIG. 2. FIG. 5 is a schematic view of a section along the line J-J in FIG. 2. FIGS. 6 and 7 are figures illustrating the linear extension/retraction movement of the support shaft 110. FIG. 6 shows a section along the line I-I (left diagram) and a section along the line K-K (right diagram) in FIG. 5, when the support shaft 110 has moved linearly in the direction in which it protrudes from the housing 130 and has reached one end of its range of linear movement. FIG. 7 shows a section along the line I-I (left diagram) and a section along the line K-K (right diagram), when the support shaft 110 has moved linearly in the direction in which it is drawn into the housing 130 and has reached the other end of its range of linear movement. FIG. 8 is a perspective view schematically showing the external appearance of a biasing member 160. FIG. 9 is a diagram illustrating another example of a holding section holding the biasing member 160. FIG. 10 is an enlarged diagram showing the surroundings of a holding member 171 in FIG. 9. It should be noted that arrows denote the top side and the bottom side of the cam unit 100 in FIGS. 3 to 5 as well as the left diagram in FIG. 6 and the left diagram in FIG. 7.

In the present embodiment, the cam unit 100 includes a support shaft 110, a drive shaft 120, a housing 130, a first cam mechanism 140, a second cam mechanism 150 and the like, as shown in FIGS. 3 and 4. That is to say, the plurality of cam mechanisms mentioned above refer to the first cam mechanism 140 and the second cam mechanism 150.

As explained above, the support shaft 110 supports the longitudinal center section of the gripping arm 31 at the front end of the support shaft 110. Moreover, in the present embodiment, as shown in FIG. 6, the outer diameter of the support shaft 110 changes in four stages in the axial direction of the support shaft 110. More specifically, the support shaft 110 includes, in order from the front end of the support shaft 110, a large diameter section 111, a small diameter section 112, a holding member attachment section 113, and a sliding section 114, whose outer diameters become successively smaller. The gripping arm 31 is fixed to the front end of the large diameter section 111, which protrudes from the housing 130. The small diameter section 112 supports the biasing member 160 (explained further below) in a state in which it is fitted in a tubular section 161 of the biasing member 160. The holding member attachment section 113 is the section to which a holding member 170 (explained further below) is attached. The sliding section 114 slides with respect to a turret 143 (explained further below), when the support shaft 110 is moved linearly in the above-mentioned axial direction.

The driving shaft 120 rotates around its central axis in order to drive the first cam mechanism 140 and the second cam mechanism 150.

The housing 130 is a casing that contains inside the first cam mechanism 140, the second cam mechanism 150, the support shaft 110, and the drive shaft 120. This housing 130 rotatably supports the driving shaft 120 via a drive shaft bearing 132 and turnably supports the later-described turret 143 through a turret bearing 133. Moreover, the housing 130 indirectly supports the support shaft 110, because the turret 143 is coupled to the sliding section 114 of the support shaft 110. It should be noted that, as shown in FIG. 3, a bearing tightening member 133a for suppressing play of the turret 143 in the axial direction of the support shaft 110 is provided at one end of the turret bearing 133. Furthermore, the housing 130 is provided with a tubular support shaft flange 131 in order to support the large diameter section 111 of the support shaft 110. Moreover, a sealing member 131a is provided at the front end side of the support shaft flange 131, sealing the gap between the larger diameter section 111 and the support shaft flange 131. It is also possible to provide a support member (not shown in the drawings) inside the support shaft flange 131, to make the support member support the large diameter section 111 of the support shaft 110. In this case, the support shaft 110 is supported on both ends, so that the influence of an overhang load acting from the gripping arm 31 on the support shaft 110 (and for example flexing the support shaft 110 and the like) can be alleviated.

The first cam mechanism 140 is a cam mechanism for turning the support shaft 110 and the gripping arm 31 fixed to the support shaft 110. As shown in FIG. 3, it includes a roller gear cam 141 serving as a first cam, a first cam follower 142, and the turret 143.

The roller gear cam 141 is supported by the drive shaft 120 and can be rotated together with the drive shaft 120. As shown in FIG. 5, helical tapered ribs are formed on the outer circumferential surface of the roller gear cam 141.

The first cam followers 142 are cam followers that engage with the roller gear cam 141. The turret 143 is a follower of the roller gear cam 141, and as shown in FIG. 5, four first cam followers 142 are provided in a cross-shaped arrangement on the outer circumference of the turret 143. The turret 143 is arranged near the roller gear cam 141, such that the first cam followers 142 with which the turret 143 is provided are engaged with the roller gear cam 141 when it rotates. The turret 143 is provided with a coupling hole for coupling it with the sliding section 114 of the support shaft 110, and the sliding section 114 is coupled with the turret 143 by fitting it into this coupling hole. Furthermore, in this embodiment, a spline 143a is formed on the inner wall of the coupling hole of the turret 143, and the turret 143 and the sliding section 114 are coupled by spline-coupling. Therefore, when the support shaft 110 turns around its central axis 110a, it turns together with the turret 143. On the other hand, when the support shaft 110 is moved linearly in the axial direction of the central axis 110a, the sliding section 114 slides inside the coupling hole (in other words, the support shaft 110 can move linearly relative to the turret 143).

With the first cam mechanism 140 having this configuration, when the drive shaft 120 rotates, the first cam followers 142, which engage the roller gear cam 141 as it rotates, slide on the tapered rib surface of the roller gear cam 141, so that the turret 143 and the support shaft 110 turn together. That is to say, the first cam followers 142 let the support shaft 110 turn due to the rotation of the drive shaft 120. Then, when the support shaft 110 turns, the gripping arm 31 turns around the central axis 110a of the support shaft 110, together with the support shaft 110.

The second cam mechanism 150 is a cam mechanism for letting the support shaft 110 and the gripping arm 31 move linearly in the axial direction of the support shaft 110. As shown in FIG. 4, it includes a groove cam 151 serving as a second cam, a second cam follower 152, a pivot arm 153, and a biasing member 160.

As shown in FIG. 4, the groove cam 151 is formed in a first end face of the roller gear cam 141, with respect to the axial direction of the central axis of the roller gear cam 141 (that is, the central axis of the drive axis 120). That is to say, in this embodiment, the roller gear cam 141 and the groove cam 151 are provided on a single cam body, the groove cam 151 is supported together with the roller gear cam 141 by the drive shaft 120, and they rotate together with the drive shaft 120. Also, the groove cam 151 is shaped in form of an endless ring, enclosing the drive shaft 120.

The second cam follower 152 is a cam follower that engages the groove cam 151. The pivot arm 153 is a follower of the groove cam 151, and the second cam follower 152 is provided at one end section in longitudinal direction of the pivot arm 153, as shown in FIG. 4. This pivot arm 153 is supported pivotably by a pivot shaft 153b, which is attached to the housing 130 and extends parallel to the drive shaft 120. Moreover, the pivot arm 153 is arranged further outward than the end face of the roller gear cam 141 in which the groove cam 151 is formed, such that the second cam follower 152 can be engaged by the groove cam 151 as it rotates. When the groove cam 151 rotates as the drive shaft 120 rotates, and the second cam follower 152 slides along the groove cam 151, the pivot arm 153 pivots around the pivot shaft 153b, in cooperation with second cam follower 152. It should be noted that the central section in longitudinal direction of the pivot arm 153 is wider than its longitudinal end sections, as shown in FIG. 4. Also, an arcuate opening section 153c whose arc is centered on the pivot shaft 153b and whose inner diameter is larger than the diameter of the drive shaft 120 is formed in this central section, extending over the pivot range of the pivot arm 153. Thus, the pivot arm 153 can pivot without interfering with the drive shaft 120. Also, a columnar protrusion section 153a for engaging the later-described biasing member 160 is provided at the other longitudinal end section of the pivot arm 153.

The biasing member 160 transmits the pivoting of the pivot arm 153 to the support shaft 110 and biases the support shaft 110 such that it moves linearly. As shown in FIG. 8, the biasing member 160 includes a tubular section 161, an engagement section 162, an engagement groove 163 serving as an engagement hole that engages the pivot arm 153, a sliding section 164 and the like.

The tubular section 161 is supported by the small diameter section 112 of the support shaft 110 by having the small diameter section 112 fitted into it. Moreover, when the small diameter section 112 is fitted into the tubular section 161, the central axis of the small diameter section 112 and the central axis of the tubular section 161 become substantially coaxial. Also, a film of lubricating oil is formed between the outer circumferential surface of the small diameter section 112 and the inner circumferential surface of the tubular section 161. In other words, a gap that allows the formation of an oil film is provided between the small diameter section 112 and the tubular section 161. Thus, the tubular section 161 can be turned relatively to the small diameter section 112. Moreover, the tubular section 161 is supported by the small diameter section 112 in such a manner that it can move linearly together with the small diameter section 112. That is to say, when the support shaft 110 turns around the central axis 110a, the support shaft 110 turns relative to the biasing member 160. On the other hand, when the support shaft 110 moves linearly in the axial direction of the central axis 110a, the support shaft 110 moves linearly together with the biasing member 160. Moreover, the outer diameter of the tubular section 161 is equal to or smaller than the outer diameter of the large diameter section 111 of the support shaft 110. Therefore, during linear motion of the support shaft 110, the tubular section 161 supported by the small diameter section 112 does not interfere with the support shaft flange 131 and can enter the support shaft flange 131 (see FIG. 6). Furthermore, the axial length of the central axis of the tubular section 161 (that is, the central axis 110a of the support shaft 110) is longer than the axial length of the central axis of the small diameter section 112. And the inner diameter of the tubular section 161 changes in two steps. Of the inner circumferential surfaces of the tubular section 161, the portion having the smaller inner diameter is in surface contact with the outer circumferential surface of the small diameter section 112 of the support shaft 110, and the later-described holding member 170 is arranged between the portion having the larger inner diameter and the holding member attachment section 113 of the support shaft 110, as shown in FIGS. 6 and 7.

The engagement section 162 is adjacent to an end section that is further away from the gripping arm 31, of the two axial end sections of the tubular section 161. As shown in FIG. 8, the engagement section 162 has a tubular shape (in this embodiment approximately that of a quarter cylinder) whose outer diameter is larger than the outer diameter of the tubular section 161. The engagement groove 163 is provided in the engagement section 162 and engages the protrusion section 153a of the pivot arm 153. The engagement groove 163 is formed at that end section that is further away from the tubular section 161, of the two axial end sections of the outer circumferential surface of the engagement section 162 (that is, the two axial end sections of the outer circumferential surface with respect to the axial direction of the support shaft 110). Moreover, the engagement groove 163 is formed with an elliptical shape along the circumferential direction of the arcuate surface, and the longer diameter of the engagement groove 163 has a length that corresponds to the pivot range of the pivot arm 153. Moreover, the engagement section 162 extends in the axial direction of the support shaft 110 to a position where the engagement groove 163 can engage the protrusion section 153a of the pivot arm 153. It should be noted that the inner diameter of the engagement section 162 is adjusted such that the engagement section 162 does not interfere with the turret 143 and the first cam follower 142 when the biasing member 160 moves linearly together with the support shaft 110, as shown in FIGS. 6 and 7.

The sliding section 164 is provided above the engagement groove 163 on the outer circumferential surface of the engagement section 162. The sliding section 164 has a through hole for passing a sliding shaft 164a, which is fixed to the housing 130 such that it is arranged parallel to the support shaft 110. When the biasing member 160 and the support shaft 110 move together linearly, the sliding section 164 slides along the sliding shaft 164a, which is passed through the through hole. On the other hand, when the support shaft 110 and the biasing member 160 turn relatively to one another, the sliding section 164 prevents the biasing member 160 from turning due to a friction force between the tubular section 161 and the small diameter section 112. That is to say, in this embodiment, the sliding section 164 has the function of preventing turning of the biasing member 160.

With the biasing member 160 having the above-described configuration, when the pivot arm 153 pivots, the protrusion section 153a of the pivot arm 153 moves within the engagement groove 163 in the large-diameter direction of the engagement groove 163. In this situation, the protrusion section 153a pushes in the axial direction of the support shaft 110 against the inner surface of the engagement groove 163. That is to say, the pivoting of the pivot arm 153 is transmitted to the biasing member 160, and due to the biasing of the support shaft 110 in the axial direction of the central axis 110a of the support shaft 110 with the biasing member 160, the support shaft 110 moves linearly in the axial direction together with the biasing member 160.

Furthermore, as noted above, in this embodiment, a holding member 170 for holding the biasing member 160 is arranged between the holding member attachment section 113 and the tubular section 161. With this holding member 170, the biasing member 160 is held such that it can move linearly together with the support shaft 110. More specifically, it is supported by the small diameter section 112 in a state in which the tubular section 161 of the biasing member 160 is clamped between the holding member 170 and the large diameter section 111 of the support shaft 110. As a result, play of the tubular section 161 with respect to the axial direction of the support shaft 110 is reduced, and the entire biasing member 160 is moved linearly together with the support shaft 110. In other words, the tubular section 161 is restrained by the holding member 170 in such a manner that it does not slide on the small diameter section 112. It should be noted that the holding member 170 is fixed to the holding member attachment section 113 of the support shaft 110 by set bolts.

With such a second cam mechanism 150, a rotation of the drive shaft 120 is first converted by the second cam follower 152 that slides within the groove cam 151 into a pivoting of the pivot arm 153 with which the second cam follower 152 is provided. Then, the pivoting of the pivot arm 153 is converted into a linear motion of the support shaft 110 by the biasing member 160 engaging the pivot arm 153, and thus the gripping arm 31 supported by the support shaft 110 moves linearly in the axial direction of the support shaft 110. In this situation, the large diameter section 111 of the support shaft 110 slides on the sealing member 131a, the sliding section 114, which is spline-coupled to the turret 143, slides within the coupling hole of the turret 143, and the sliding section 164 slides on the sliding shaft 164a. Then, the support shaft 110 moves back and forth within a constant movement range (referred to below as "linear movement range") in the axial direction of the center axis 110a of the support shaft 110. Here, when the support shaft 110 moves linearly in the direction in which the large diameter section 111 protrudes from the housing 130 and reaches one end of the linear movement range, the tubular section 161 enters the support shaft flange 131 and the engagement section 162 is separated from the first cam follower 142, as shown in FIG. 6. On the other hand, when the support shaft 110 moves linearly in the direction in which the large diameter section 111 is received by the housing 130 and reaches the other end of the linear movement range, the engagement section 162 encircles the turret 143 and the first cam followers 142, as shown in FIG. 7.

With the cam unit 100 configured in this manner, when the drive motor 40 is started, the first cam mechanism 140 and the second cam mechanism 150 each drive the support shaft 110 and the gripping arm 31 without interfering with each other.

As noted above, a gap that allows the formation of an oil film is provided between the small diameter section 112 and the tubular section 161, such that the support shaft 110 can turn relative to the biasing member 160. That is to say, the tubular section 161 is coupled slidingly to the small diameter section 112. Here, when the biasing member 160 moves linearly together with the support shaft 110, it may occur that the central axis of the tubular section 161 does not match the central axis 110a of the support shaft 110. In other words, when the biasing member 160 moves linearly, there is play that is caused by this gap, and the central axis of the tubular section 161 may tilt with respect to the central axis 110a of the support shaft 110. In order to reduce the tilt of the central axis of the tubular section 161 with respect to the central axis 110a of the support shaft 110 while ensuring a gap that allows the formation of an oil film, it is necessary to increase the length of the tubular section 161 with respect to the central axis direction of the tubular section 161. Accordingly, also the axis length of the support shaft 110 (or more precisely, the small diameter section 112 of the support shaft 110) becomes longer. Thus, as shown in FIG. 9, it is conceivable that rolling members 172, such as steel balls or the like, are fitted between the small diameter section 112 and the tubular section 161, and the small diameter section 112 and the tubular section 161 are in contact with each other through the rolling member 172. In this case, since the tubular section 161 contacts the small diameter section 112 of the support shaft 110 through the rolling members 172, the support shaft 110 can turn relative to the biasing member 160 even when no gap is provided. Furthermore, when no gap is necessary, the central axis of the tubular section 161 will not tilt with respect to the central axis 110a of the support shaft 110, so that it becomes unnecessary to increase the length of the tubular section 161 with respect to the central axis direction of the tubular section 161. As a result, the length of the entire support shaft 110 can be shortened, so that it becomes possible to further reduce the influence of the overhang load acting on the support shaft 110.

Furthermore, if rolling members 172 are used, a rolling member receiving groove 115 for receiving the rolling members 172 is formed between the small diameter section 112 and the tubular section 161, as shown in FIG. 10. A holding member 171 (that is, a holding member that is different from the holding member 170 shown in FIGS. 6 and 7) holding the biasing member 160 via the rolling members 172 is fixed to the holding member attachment section 113 of the support shaft 110. This holding member 171 applies such a preload on the rolling members 172 that they are urged towards the large diameter section 111 of the support shaft 110. Further, in order to adjust this preload, the holding member 171 is provided with a threaded section 171a that is processed to be threaded. Then, when the holding member 171 is screwed with the threaded section 171a onto the holding member attachment section 113, the preload can be adjusted by adjusting the extent to which the threaded section 171a is fastened.

Operation Example of Lathe Unit

Figure 11:
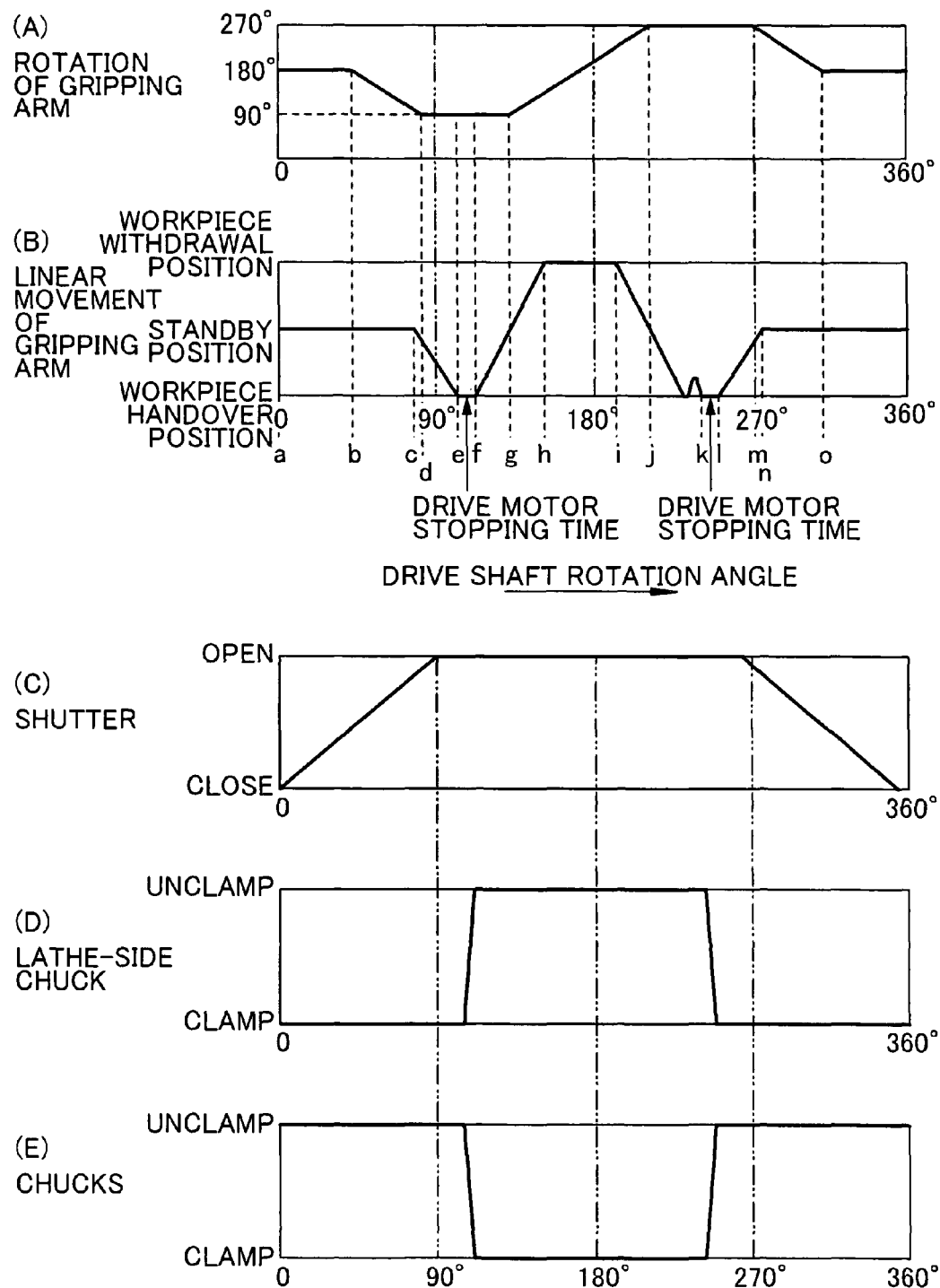
FIG. 11 is an example of a timing graph illustrating the operation of the various components of the lathe unit 10 as the AWC 30 exchanges a workpiece.
Figure 12A:
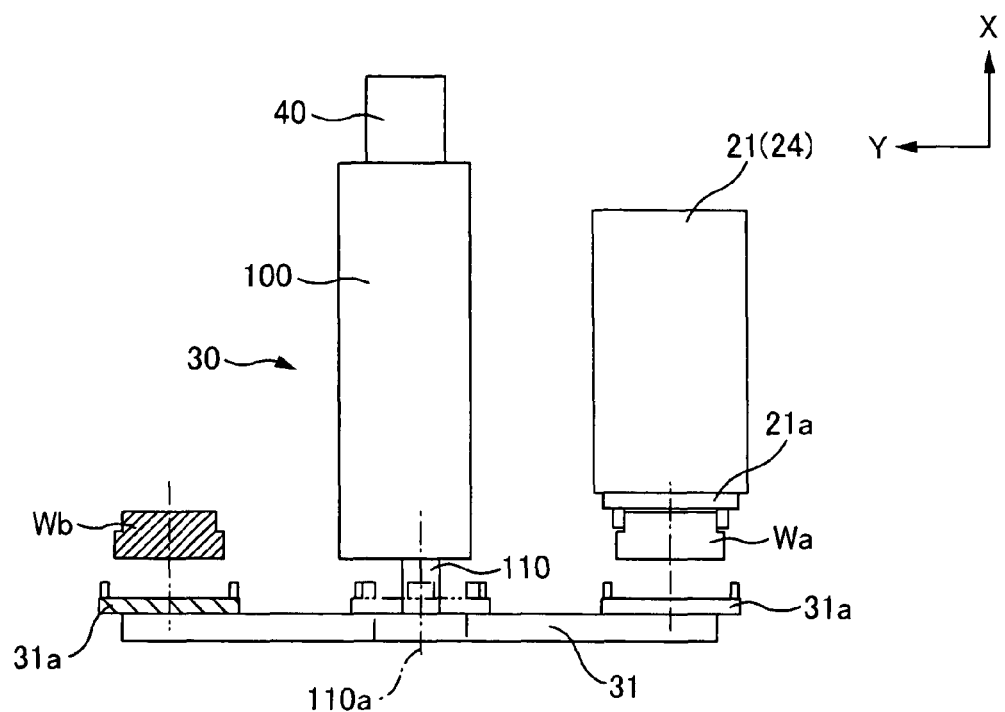
FIG. 12A is a schematic diagram showing the state of the gripping arm 31, the chucks 31a, and the lathe-side chuck 21a during the first turn operation.
Figure 12A:
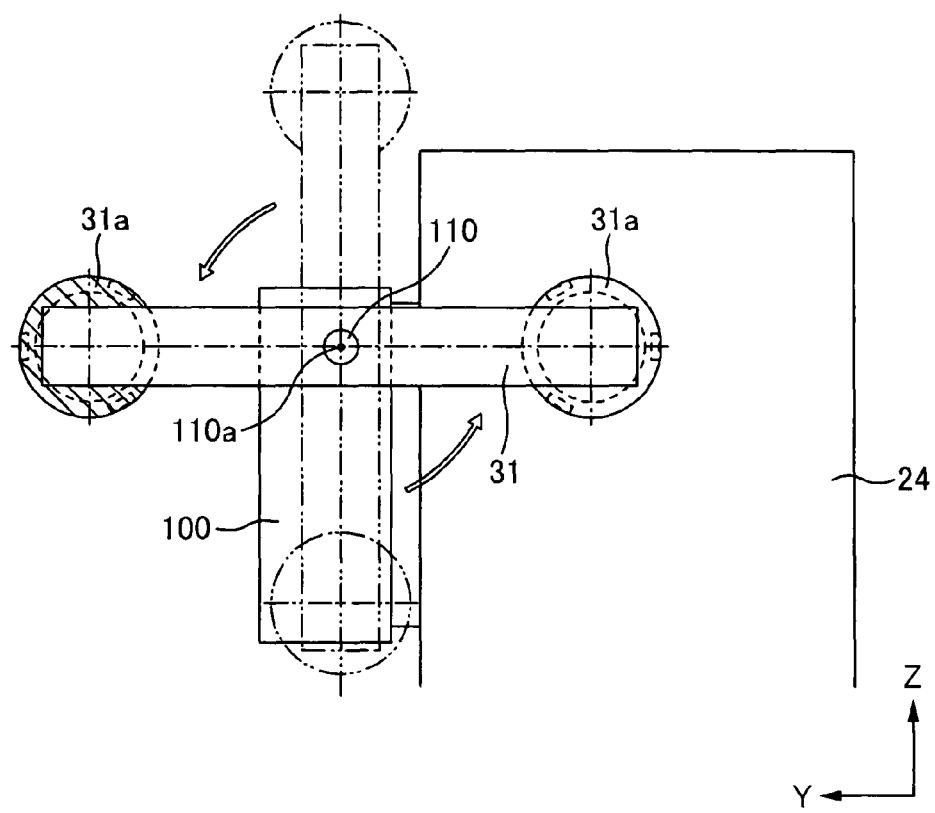
Figure 12B:
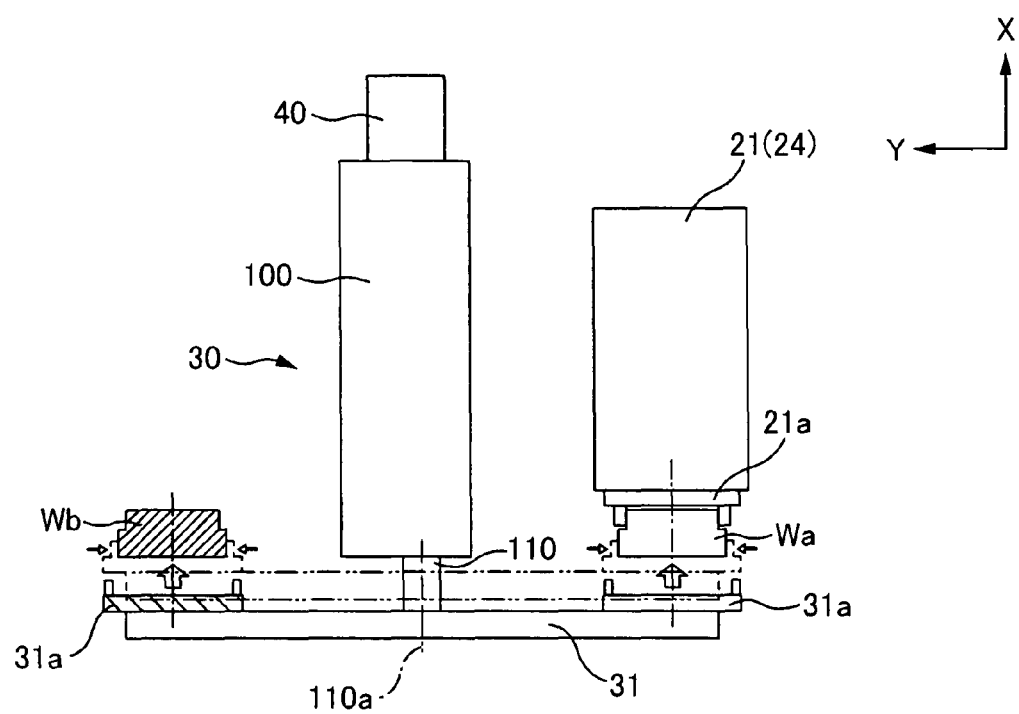
FIG. 12B is a schematic diagram showing the state of the gripping arm 31, the chucks 31a, and the lathe-side chuck 21a during the first linear movement operation.
Figure 12B:
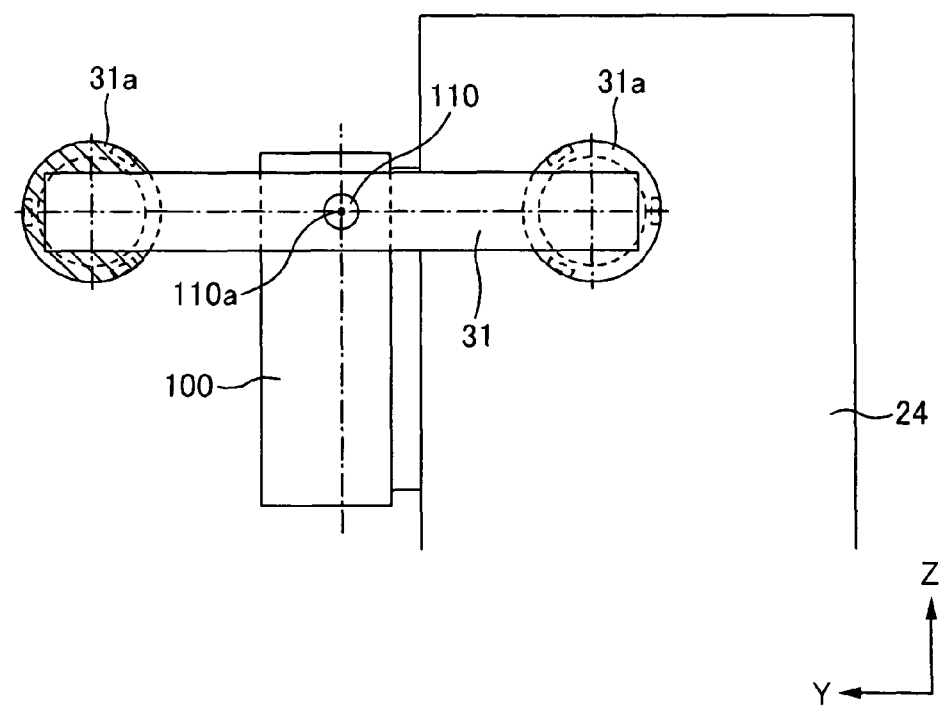
Figure 12C:
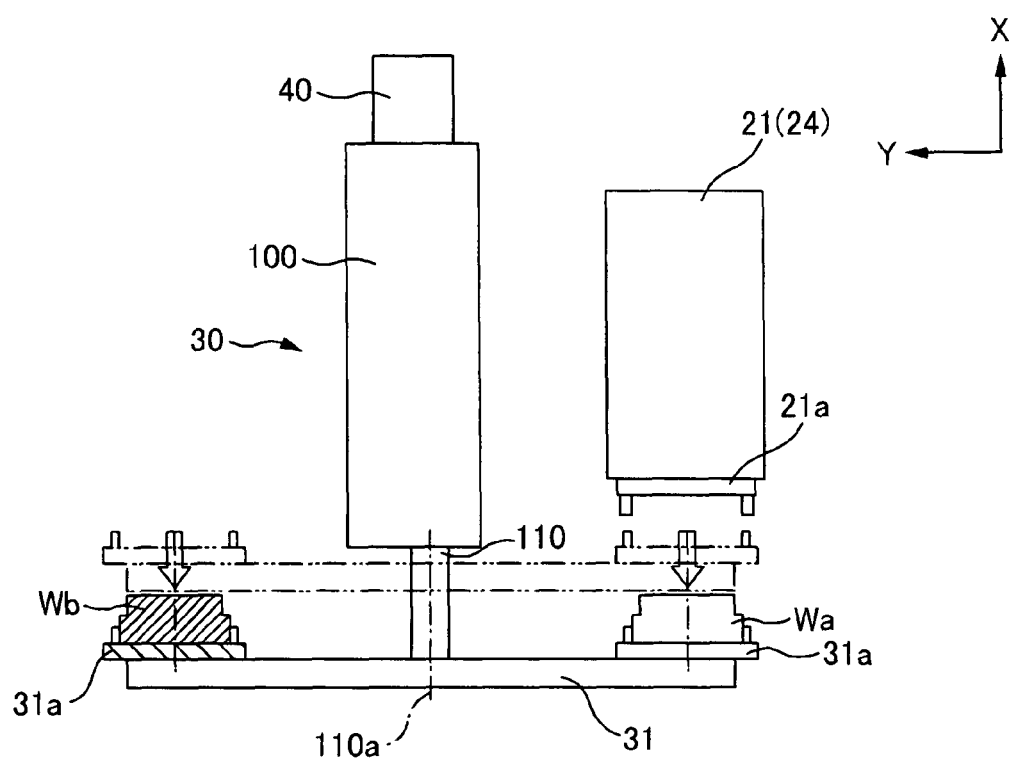
FIG. 12C is a schematic diagram showing the state of the gripping arm 31, the chucks 31a, and the lathe-side chuck 21a during the second linear movement operation.
Figure 12C:
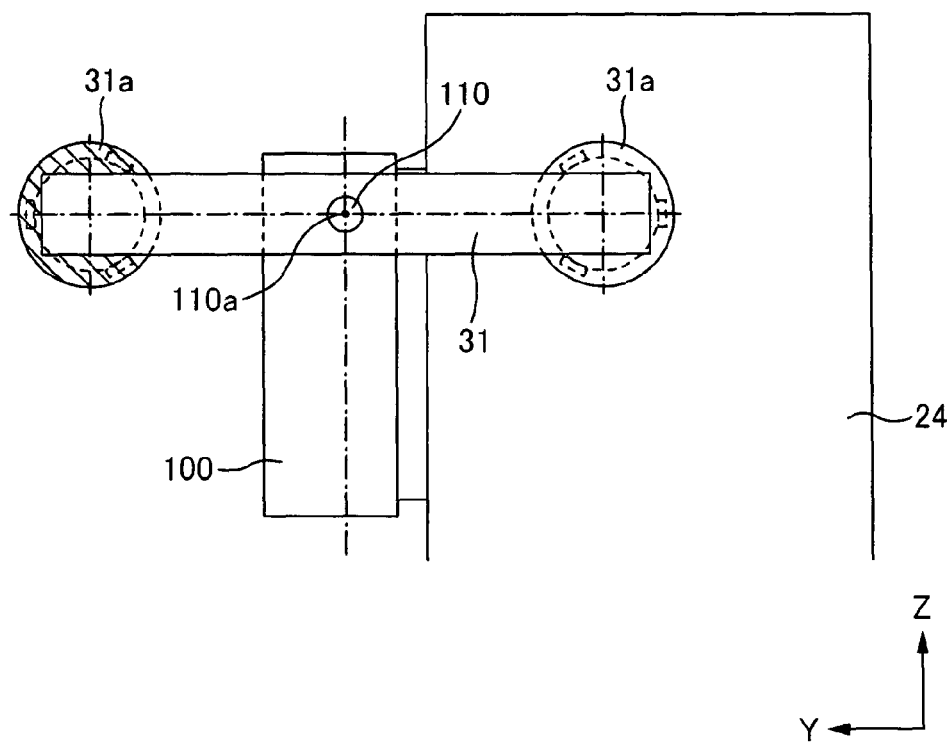
Figure 12D:
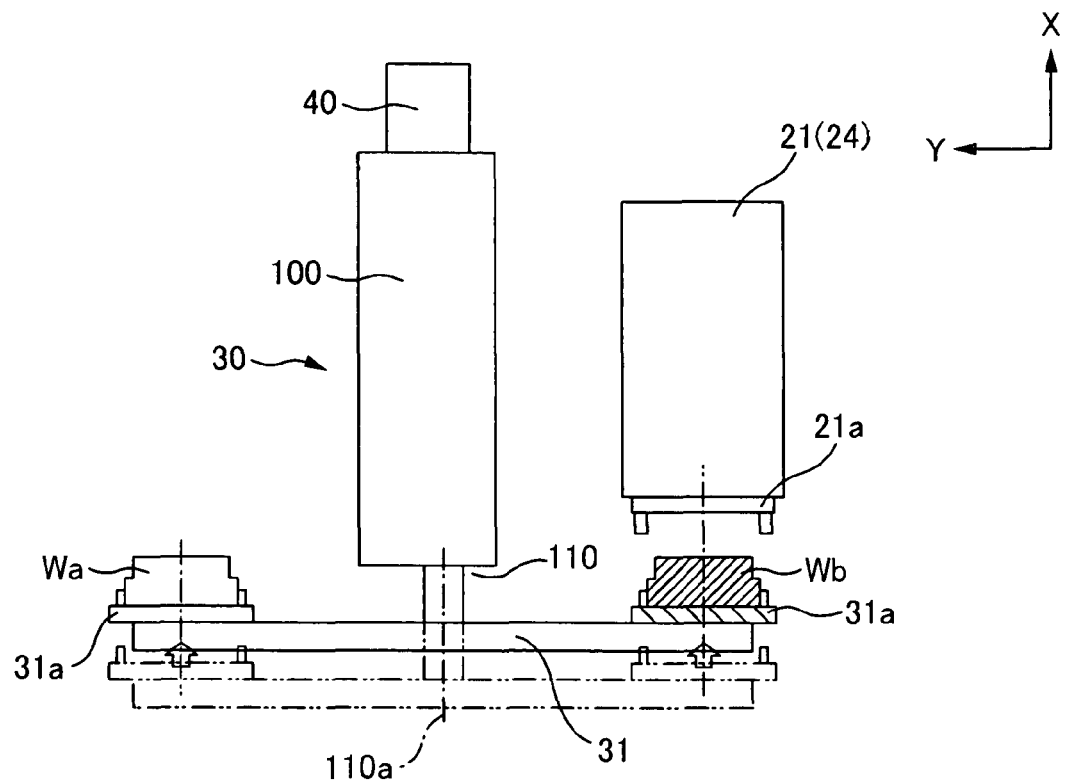
FIG. 12D is a schematic diagram showing the state of the gripping arm 31, the chucks 31a, and the lathe-side chuck 21a during the second turn operation.
Figure 12D:
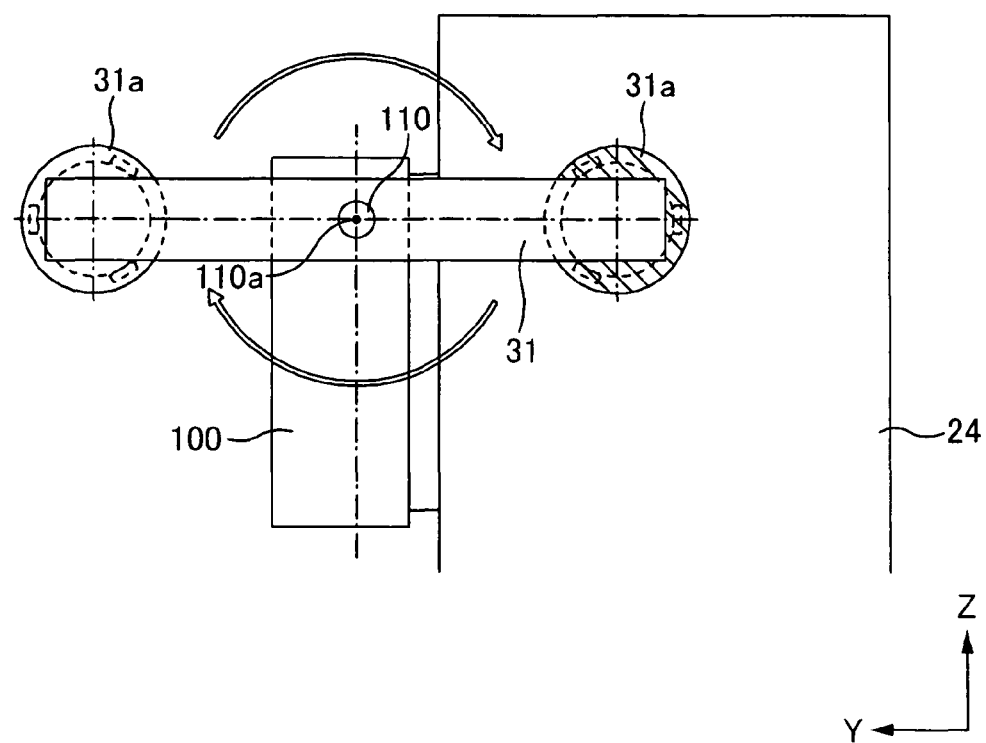
Figure 12E:
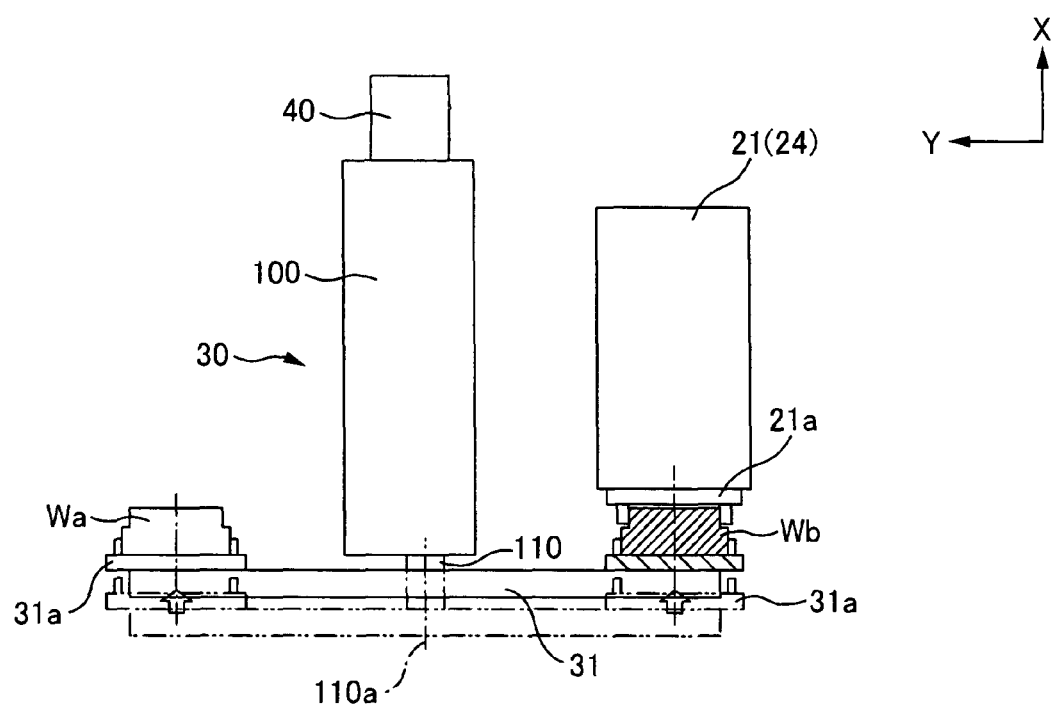
FIG. 12E is a schematic diagram showing the state of the gripping arm 31, the chucks 31a, and the lathe-side chuck 21a during the third linear movement operation.
Figure 12E:
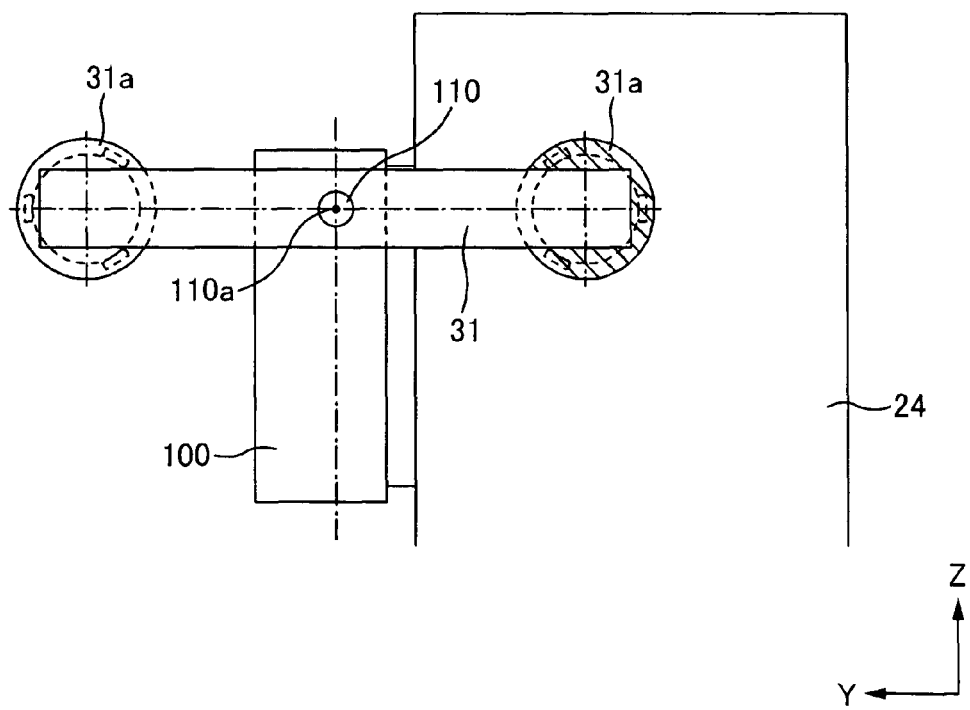
Figure 12F:
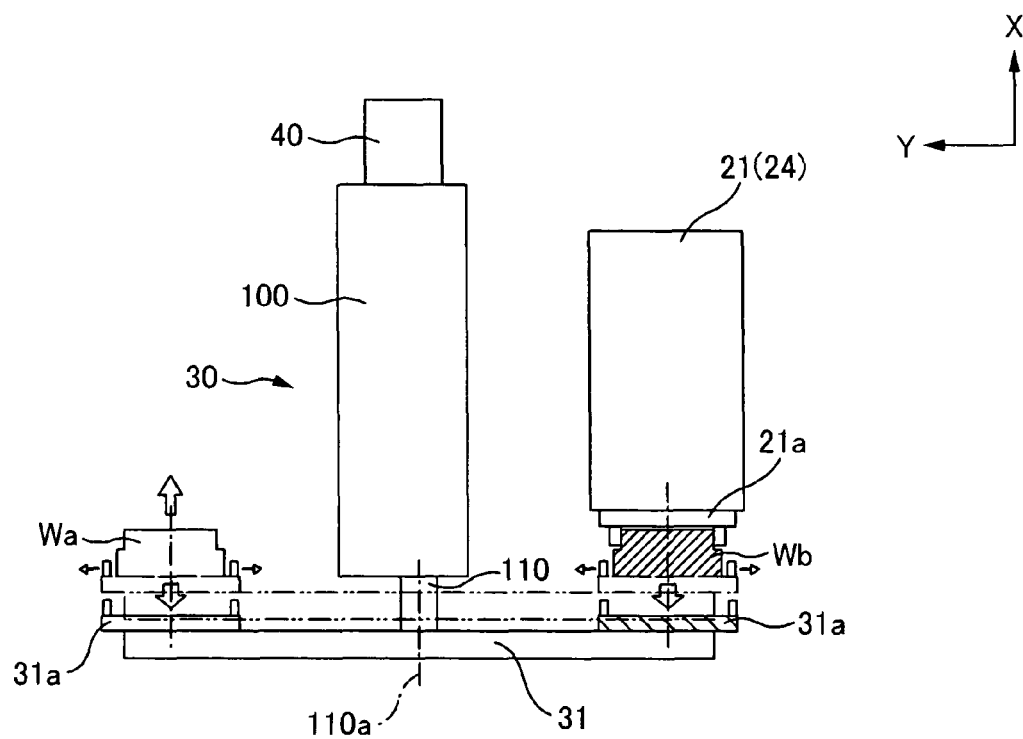
FIG. 12F is a schematic diagram showing the state of the gripping arm 31, the chucks 31a, and the lathe-side chuck 21a during the fourth linear movement operation.
Figure 12F:
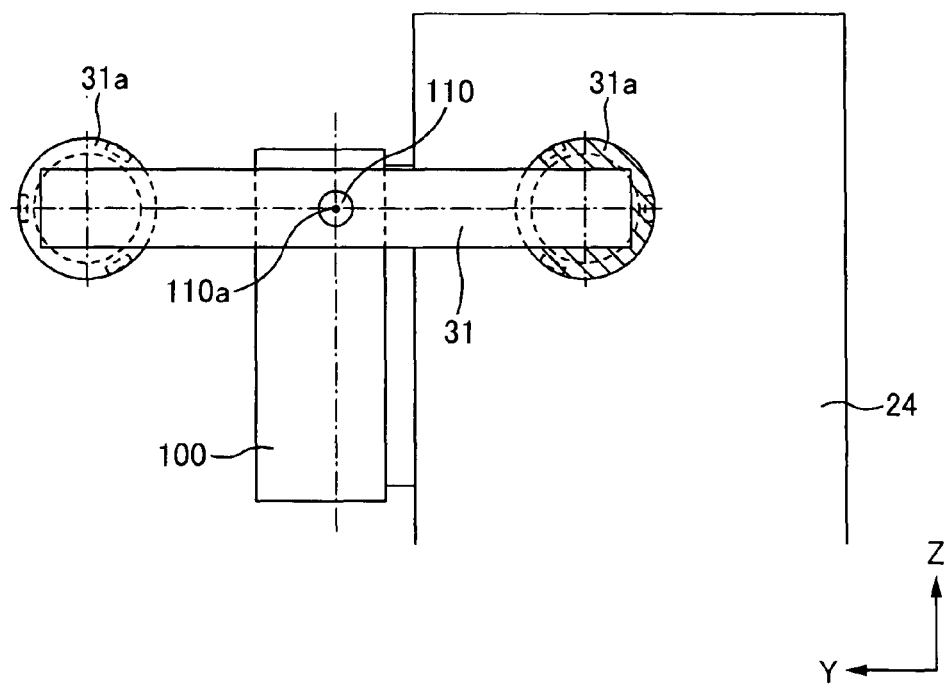
Figure 12G:
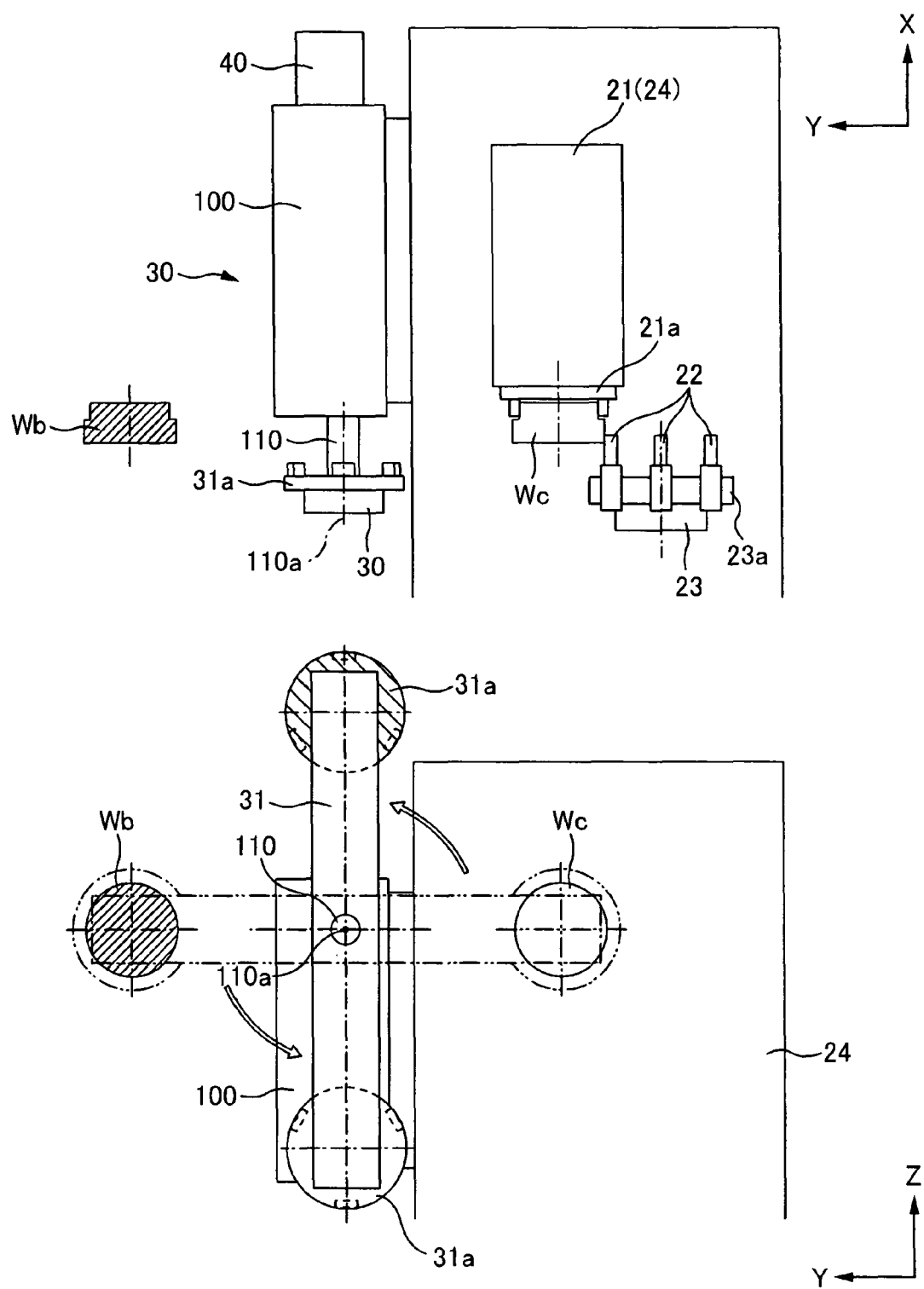
FIG. 12G is a schematic diagram showing the state of the gripping arm 31, the chucks 31a, and the lathe-side chuck 21a during the third turn operation.

Referring to FIGS. 11 through 12G, the following is an explanation of an operation example of the various components of the lathe unit 10 when the AWC 30 exchanges a workpiece. As noted above, no workpiece is exchanged with the AWC 30 when the lathe unit 10 is started up or stopped. However, the operation of the various components of the lathe unit 10 when the lathe unit 10 is started up or stopped is substantially the same as the operation during the workpiece exchange, so that the following explanations are for the operation during a workpiece exchange.

FIG. 11 is an example of a timing graph illustrating the operation of the various components of the lathe unit 10 as the AWC 30 exchanges a workpiece. FIG. 11 shows a graph of the turn operation of the gripping arm 31 (Graph A), a graph of the linear movement of the gripping arm 31 (Graph B), a graph of the open/close operation of the shutter compartmentalizing the workpiece storage space and the lathe unit 10 (Graph C), a graph of the clamping/unclamping operation of the lathe-side chuck 21*a* (Graph D), and a graph of the clamping/unclamping operation of the chuck 31*a* of the gripping arm 31 (Graph E). It should be noted that in FIG. 11, the letters "a" to "o" denote various rotation advancement states (that is, rotation angles from the initial state) of the drive shaft 120, as the drive shaft 120 rotates once. For example, state "a" is a state in which the drive shaft 120 has rotated 0° from its initial state (that is, a state of no rotation), and state "m" is a state in which the drive shaft 120 has rotated 270°.

FIGS. 12A to 12G are schematic views illustrating the gripping arm 31, the chuck 31*a*, and the lathe-side chuck 21*a* at the various points in time during the workpiece exchange. FIG. 12A is a diagram showing the first turn operation, FIG. 12B is a diagram showing the first linear movement operation, FIG. 12C is a diagram showing the second linear movement operation, FIG. 12D is a diagram showing the second turn operation, FIG. 12E is a diagram showing the third linear movement operation, FIG. 12F is a diagram showing the fourth linear movement operation, and FIG. 12G is a diagram showing the third turn operation. FIGS. 12A to 12G each include a diagram showing the gripping arm 31, the chuck 31*a*, the lathe-side chuck 21*a*, the machined workpiece Wa and the unmachined workpiece Wb from above (upper diagram) and a diagram taken from the side that is opposite to the side to which the chuck 31*a* of the gripping arm 31 is fixed (lower diagram). It should be noted that in FIGS. 12A to 12G, the X-axis and the Y-axis in FIG. 1 are marked by arrows in the upper diagrams, whereas the Y-axis and the Z-axis are marked by arrows in the lower diagrams.

First, in the phase immediately before the AWC 30 exchanges the workpiece, the various components of the lathe unit 10 are in the initial state. More specifically, in the AWC 30, the drive motor 40 is stopped, the gripping arm 31 is in a standby position (the position in which the gripping arm 31 is arranged in the X-axis direction in FIG. 12A), in which the longitudinal direction of the gripping arm 31 extends in the direction of the Z-axis (which is the state of the gripping arm 31 as indicated by the chain double-dashed line in FIG. 12A). Moreover, the chuck 31*a* of the gripping arm 31 is in a released state (that is, in an unclamped state). On the other hand, the lathe 20 is in a state of machining the workpiece. That is to say, the lathe-side chuck 21*a* provided on the main shaft 21 of the lathe 20 grips a small diameter section of the workpiece Wc being machined (that is, it is in a clamped state). Moreover, the shutter is in a closed state.

After this, when the machining of the workpiece with the lathe 20 is finished (in other words, when the machined workpiece Wa has been produced), the shutter opens, as shown in FIG. 11C, and the gripping arm 31 can enter the workpiece storage space. On the other hand, the drive motor 40 of the AWC 30 is started, the drive shaft 120 of the cam unit 100 begins to rotate, driving the first cam mechanism 140 and the second cam mechanism 150. That is to say, the AWC 30 starts the workpiece exchange. It should be noted that the state of the drive shaft 120 immediately after the start of the workpiece exchange is, of course, state "a".

Then, as the rotation of the drive shaft 120 advances and the drive shaft 120 goes from state "a" to state "b", even though the first cam mechanism 140 and the second cam mechanism 150 are driven, the gripping arm 31 is in a state in which it rests in the standby position and is in a so-called "dwelling state".

Then, when the drive shaft 120 arrives at state "b", the first cam mechanism 140 turns the support shaft 110 and the gripping arm 31 around the central axis 110*a* of the support shaft 110. That is to say, the support arm 31 performs an operation of turning by 90° in the turning direction indicated by arrows in FIG. 12A (this is referred to as "first turn operation" below). This first turn operation is carried out while the drive shaft 120 goes from state "b" to state "d", and due to this first turn operation, each of the chucks 31*a* on the gripping arm 31 are arranged in front of the machined workpiece Wa and the unmachined workpiece Wb.

When the drive shaft 120 reaches state "c", the second cam mechanism 150 moves the support shaft 110 and the gripping arm 31 linearly in the axial direction of the support shaft 110 (that is, in the X-axis direction) That is to say, the support arm 31 performs a linear movement operation (referred to as "first linear movement operation" below) in the direction indicated by the arrows in FIG. 12B. This first linear movement operation is carried out while the drive shaft 120 goes from state "c" to state "e". Through this first linear movement operation, the gripping arm 31 is brought from the standby position to a workpiece handover position for handing over the unmachined workpiece Wb and the machined workpiece Wa (the X-axis direction position in which the gripping arm 31 is arranged as indicated by the chain double-dashed line in FIG. 12B). Moreover, during the first linear movement direction, the gripping arm 31 is moved by a distance St1 in the X-axis direction (see Graph B in FIG. 11). It should be noted that in this embodiment, the gripping arm 31 starts the first linear movement operation before the first turn operation is finished, as shown in Graphs A and B of FIG. 11. That is to say, while the gripping arm 31 goes from state "c" to state "d", the first turn operation overlaps with the first linear movement operation.

Then, when the drive shaft 120 arrives at state "e", the chucks 31*a* are arranged in the workpiece handover position in front of the machined workpiece Wa and the unmachined workpiece Wb, as shown in FIG. 12B. That is to say, each of the chucks 31*a* are arranged in a position in which they can grip the machined workpiece Wa and the unmachined workpiece Wb. Then, as shown in FIG. 11, after the gripping arm 31 has been in the dwelling state for a predetermined period of time, the drive motor 40 is stopped, and the rotation of the drive shaft 120 is interrupted. When the drive motor 40 is stopped, the chucks 31*a* perform a clamping operation in which they simultaneously grip the large diameter section of the machined workpiece Wa gripped by the lathe-side chuck 21*a* and the unmachined workpiece Wb placed in the workpiece storage space, as shown in Graph E of FIG. 11. Then, when the chucks 31*a* grip the machined workpiece Wa and the unmachined workpiece Wb, the lathe-side chuck 21*a* performs an unclamping operation in which it releases the gripping state of the machined workpiece Wa, as shown in Graph D of FIG. 11. Thus, the gripping arm 31 (more precisely, the chucks 31*a* of the gripping arm 31) retrieves the machined workpiece Wa from the lathe-side chuck 21*a* and the unmachined workpiece Wb from the workpiece storage space.

It should be noted that the position of the machined workpiece Wa in the lathe 20 and the position of the unmachined workpiece Wb in the workpiece storage space are adjusted in advance such that the chucks 31*a* of the gripping arm 31 can simultaneously grip the machined workpiece Wa and the unmachined workpiece Wb. In other words, the entire lathe unit 10 is designed such that the machined workpiece Wa and the unmachined workpiece Wb are gripped simultaneously.

When each of the chucks 31*a* have gripped the machined workpiece Wa and the unmachined workpiece Wb in the workpiece handover position, the drive motor 40 starts up again, and the drive shaft 120 starts to rotate again. Then, when the drive shaft 120 reaches the state "f", the second cam mechanism 150 makes the support shaft 110 and the gripping arm 31 move linearly in the direction indicated by the arrows in FIG. 12C. That is to say, when the chucks 31*a* have gripped the machined workpiece Wa and the unmachined workpiece Wb, the gripping arm 31 performs a linear movement operation in which it is removed from the workpiece handover position (referred to as "second linear movement operation" below), as shown in FIG. 12C. This second linear movement operation is carried out while the drive shaft 120 goes from the state "f" to the state "h". Due to the second linear movement operation, the gripping arm 31 is moved from the workpiece handover position to a workpiece withdrawal position for withdrawing the machined workpiece Wa and the unmachined workpiece Wb (the X-axis direction position of the gripping arm 31 shown by the solid line in FIG. 12C). During the second linear movement operation, the gripping arm 31 is moved by only a distance St2 in the X-axis direction (see Graph B in FIG. 11). In this embodiment, the distance St2 is longer than the movement distance St1 during the first linear movement operation (in other words, with respect to the X-axis direction, the standby position is closer to the workpiece handover position than the workpiece withdrawal position). This is in order to prevent the machined workpiece Wa and the unmachined workpiece Wb gripped by the chucks 31*a* from colliding with the lathe 20 or the housing 130 of the cam unit 100 or the like when the gripping arm 31 performs the second turn operation as explained below. Then, when the gripping arm 31 arrives at the workpiece withdrawal position, it rests at the workpiece withdrawal position for a predetermined period of time (more specifically, while the drive shaft 120 goes from state "h" to state "i"), as shown in Graph B of FIG. 11.

When the drive shaft 120 reaches state "g", the first cam mechanism 140 turns the gripping arm 31 around the central axis 110*a* of the support shaft 110. That is to say, the gripping arm 31 performs an operation of turning by 180° in the turn direction indicated by the arrows in FIG. 12D (referred to as "second turn operation" below). This second turn operation is performed while the drive shaft 120 goes from state "g" to state "j", and through this second turn operation, the positions of the machined workpiece Wa and the unmachined workpiece Wb gripped by the chucks 31*a* are swapped. In particular, the unmachined workpiece Wb gripped by the chuck 31*a* is positioned in front of the lathe-side chuck 21*a* through this second turn operation, as shown in FIG. 12D. It should be noted that, as shown in Graphs A and B of FIG. 11, the second turn operation is started before the second linear movement operation is finished, and the second turn operation overlaps with the second linear movement operation while the gripping arm 31 goes from state "g" to state "h".

Furthermore, when the drive shaft 120 reaches state "i", the second cam mechanism 150 moves the support shaft 110 and the gripping arm 31 linearly in the direction indicated by the arrows in FIG. 12E. That is to say, a linear movement operation towards a workpiece handover position is carried out that lets the gripping arm 31 release the machined workpiece Wa and the unmachined workpiece Wb that have been swapped by the second turn operation at a workpiece handover position (this is referred to as "third linear movement operation" below). This third linear movement operation is performed while the drive shaft 120 goes from state "i" to state "k". Then, through this third linear movement operation, the gripping arm 31 is brought into a workpiece handover position in which the lathe-side chuck 21*a* receives the unmachined workpiece Wb and the workpiece storage space receives the machined workpiece Wa. Accordingly, during the third linear movement operation, the gripping arm 31 is moved by only a distance St2 in the X-axis direction. In this embodiment, the third linear movement operation is started before the second turn operation is finished, and the second turn operation overlaps with the third linear movement operation while the gripping arm 31 goes from state "i" to state "j". Therefore, as shown in FIG. 12D, when the second turn operation has finished, the gripping arm 31 is already removed from the workpiece withdrawal position, and has reached a position that is somewhat closer to the workpiece handover position (the X-axis direction position of the gripping arm 31 indicated by the solid line in FIG. 12D).

Then, as shown in FIG. 12E, when the gripping arm 31 reaches the workpiece handover position, the machined workpiece Wa and the unmachined workpiece Wb gripped by the chucks 31*a* are arranged in predetermined positions (the positions of the machined workpiece Wa and the unmachined workpiece Wb shown in FIG. 12E). In particular, the unmachined workpiece Wb comes to contact the lathe-side chuck 21*a*. However, when the gripping arm 31 is moved from the workpiece withdrawal position to the workpiece handover position and reaches the workpiece handover position, and the unmachined workpiece Wb contacts the lathe-side chuck 21*a*, the unmachined workpiece Wb may deviate from that predetermined position due to backlash at the time of contact. Therefore, in this embodiment, when the gripping arm 31 reaches the workpiece handover position during the third linear movement operation, it is retracted by only a distance St3 (see Graph B in FIG. 11) from the workpiece handover position. After this, the gripping arm 31 is advanced by only the distance St3 towards the workpiece handover position, and again reaches the workpiece handover position. Here, the distance St3 is shorter than the distance St1 and the distance St2. That is to say, by letting the gripping arm 31 move linearly back and forth for a relatively short distance St3 after first reaching the workpiece handover position, it is possible to reduce the positional deviation of the unmachined workpiece Wb that may occur during the contact with the lathe-side chuck 21*a* when the gripping arm 31 reaches the workpiece handover position.

Moreover, when the drive shaft 120 reaches the state "k", after the support shaft 110 and the gripping arm 31 have rested in the dwelling state for a predetermined period of time, the drive motor 40 stops and the rotation of the drive shaft 120 is interrupted, as shown in FIG. 11. When the drive motor 40 stops, the lathe-side chuck 21*a* performs a clamping operation, in which it grips the small diameter section of the unmachined workpiece Wb, as shown in Graph D of FIG. 11. Then, when the lathe-side chuck 21*a* has gripped the small diameter section of the unmachined workpiece Wb, the chuck 31*a* of the gripping arm 31 performs an unclamping operation, in which it releases the gripping of the machined workpiece Wa and the unmachined workpiece Wb, as shown in Graph E of FIG. 11, and the machined workpiece Wa and the unmachined workpiece Wb are released simultaneously. Thus, the machined workpiece Wa is handed over from the chuck 31*a* of the gripping arm 31 to the workpiece storage space, and the unmachined workpiece Wb is handed over from the chuck 31*a* of the gripping arm 31 to the lathe-side chuck 21*a*.

When the machined workpiece Wa and the unmachined workpiece Wb are released from the chucks 31*a*, the drive motor 40 is started again, and the rotation of the drive shaft 120 is started over. Then, when the drive shaft 120 reaches state "l", the support shaft 110 and the gripping arm 31 are moved linearly by the second cam mechanism 150 in the direction indicated by the arrows in FIG. 12F. That is to say, the gripping arm 31 performs a linear movement operation from the workpiece handover position back to the standby position (referred to as "fourth linear movement operation" below). This fourth linear movement operation is performed while the drive shaft 120 moves from state "l" to state "n" and the gripping arm 31 is moved due to this fourth linear movement operation by only a distance St1 in the X-axis direction until it reaches the standby position.

When the drive shaft 120 reaches the state "m", the first cam mechanism 140 causes the gripping arm 31 to perform a turn operation in which it turns by 90° in the turn direction indicated by the arrows in FIG. 12G (referred to as "third turn operation" below). This third turn operation is performed while the drive shaft 120 goes from state "m" to state "o", and the gripping arm 31 is restored to its initial state through this third turn operation. It should be noted that the third turn operation begins before the fourth linear movement operation is finished, and the fourth linear movement operation overlaps with the third turn operation while the drive shaft 120 goes from state "m" to state "n".

Then, the gripping arm 31 is on standby, in a standby position, in which the longitudinal direction of the gripping arm 31 extends in the Z-axis direction, and the support shaft 110 and the gripping arm 31 remain in the dwelling state until the drive shaft 120 has rotated once. Then, when the drive shaft 120 has rotated once, the drive motor 40 stops, whereas the lathe 20 starts the machining of the unmachined workpiece Wb, as shown in FIG. 12G. Moreover, the shutter closes, a new unmachined workpiece Wb (different to the unmachined workpiece Wb that has been gripped by the lathe-side chuck 21a) is placed in the workpiece storage space, and the various components of the lathe unit 10 are restored to their initial state. Moreover, as the machining of the workpiece with the lathe 20 advances, the lathe-side chuck 21a grips the workpiece Wc that is being machined.

The foregoing series of operations is carried out in the lathe unit 10, and a single workpiece exchange is terminated. Moreover, the starting times and the turn amounts of the various turn operations performed by the gripping arm 31 are adjusted by the shape of a tapered ribs of the roller gear arm 141, whereas the starting times and the moving distances of the linear movement operations performed by the gripping arm 31 are adjusted by the groove shape of the groove cam 151. As noted above, during the operations carried out by the gripping arm 31, there may be an overlap between operations, in order to shorten the time for the workpiece exchange. This overlap of operations times can be realized because the driving of the first cam mechanism 140 does not interfere with the driving of the second cam mechanism 150 in the cam unit 100. However, it is also possible to start a following operation only after the previous operation has finished, without overlap among the operations.

Furthermore, it is possible to use the drive motor 40 as the driving force for the opening and closing of the shutter and the clamping/unclamping operations of the chucks 31a of the gripping arm 31 and the lathe-side chucks 21a. In this case, it is easy to synchronize the operations of the various components of the lathe unit 10 during the workpiece exchange, so that the time for the workpiece exchange can be shortened even further.

Efficiency of the AWC According to this Embodiment

As described above, the AWC 30 for exchanging a machined workpiece Wa with an unmachined workpiece Wb includes a gripping arm 31 having chucks 31a for gripping a machined workpiece Wa and an unmachined workpiece Wb at respective end sections in longitudinal direction, the gripping arm 31 being able to turn around a turn axis positioned in the center section in a longitudinal direction of the gripping arm 31 and being linearly movable in an axial direction of the turn axis; a first cam mechanism 140 for turning the gripping arm 31; and a second cam mechanism 150 for linearly moving the gripping arm 31. This AWC 30 has a simple mechanical configuration realized with cam mechanisms and allows the speedy exchange of a machined workpiece Wa with an unmachined workpiece Wb.

That is to say, as explained in the section "Background of the Invention", conventional workpiece exchanging apparatuses were mostly increasingly bulky and expensive, so that as a result, it became difficult to shorten the time for the workpiece exchange. For example, in workpiece transport devices, such as loaders, of conventional workpiece exchanging apparatuses the workpiece transport path over which the machined workpiece Wa and the unmachined workpiece Wb are transported during the workpiece exchange becomes increasingly longer, so that the overall apparatus becomes larger and it becomes hard to shorten the time for the workpiece exchange. On the other hand, handling robots as another type of workpiece exchanging apparatuses use up less set-up space than workpiece transport apparatuses, so that as an entire apparatus they are easy to devise small, but they are mostly expensive, and also require complicated operation settings and maintenance. That is to say, the introduction of handling robots requires a large investment, so that as a result, it is difficult to strive for shorter workpiece exchange times. Furthermore, with ordinary handling robots, a gripping section for gripping the workpiece is provided only at one location, so that it is difficult to exchange workpieces efficiently.

On the other hand, with the AWC 30 according to this embodiment, the gripping arm 31 performing the series of operations for workpiece exchange is driven by a cam mechanism. That is to say, the AWC 30 has a simple mechanical configuration, so that compared to conventional workpiece exchanging apparatuses, its durability is high, and it is easier to devise a more compact and less expensive apparatus. Moreover, the gripping arm 31 is driven using a cam mechanism, so that the positioning accuracy of the gripping arm 31 is high, and the handover of the machined workpiece Wa and the unmachined workpiece Wb can be carried out appropriately. Furthermore, in this embodiment, chucks 31a for gripping the machined workpiece Wa and the unmachined workpiece Wb are provided at both longitudinal end sections of the gripping arm 31. Thus, the machined workpiece Wa and the unmachined workpiece Wb are gripped simultaneously, so that the workpiece exchange is performed efficiently. Due to these effects, the AWC 30 can exchange machined workpieces Wa and unmachined workpieces Wb quicker than conventional workpiece exchanging apparatuses.

Other Embodiments

The foregoing is an explanation of a workpiece exchanging apparatus according to an embodiment of the present invention, but the foregoing embodiment of the invention is merely for the purpose of elucidating the present invention and is not to be interpreted as limiting the present invention. The invention can of course be altered and improved without departing from the gist thereof and includes functional equivalents.

The above embodiment was explained for an example of a lathe unit 10 including a lathe 20 and an AWC 30 as a workpiece machining station using a workpiece exchanging apparatus. That is to say, the AWC 30 is a workpiece exchanging apparatus which exchanges a workpiece with a lathe 20, but there is no limitation to this. That is to say, the workpiece exchanging apparatus according to the present invention can also be used for other workpiece machining apparatuses, such as cutting machines, grinding machines, or welding machines.

Moreover, the workpiece shape is not limited to that of a member configured by having two columnar sections of different outer diameter that are arranged on a common axis. As long as the shape of the chucks 31a of the gripping arm 31 and the chuck on the side of the workpiece machining apparatus can be adjusted, it is possible to apply the present invention to workpieces of a wide variety of shapes.

Furthermore, in this embodiment, a case has been explained in which the gripping arm 31 carries out a first linear movement operation to a workpiece handover position to let the chucks 31a grip the machined workpiece Wa and the unmachined workpiece Wb, a second linear movement operation towards a workpiece withdrawal position to withdraw the machined workpiece Wa and the unmachined workpiece Wb that have been received in the workpiece handover position, a second turning operation in which the positions of the machined workpiece Wa and the unmachined workpiece Wb are swapped by turning, a third linear movement operation towards the workpiece handover position in order to let the chucks 31a release the machined workpiece Wa and the unmachined workpiece Wb, and a fourth linear movement operation back to the standby position. That is to say, in the above-described embodiment, in the workpiece handover position, the AWC 30 simultaneously collects the machined workpiece Wa and the unmachined workpiece Wb, and simultaneously releases them. However, there is no limitation to this, and for example, the handover position of the machined workpiece Wa may differ with respect to the X-axis direction in FIG. 1 from the handover position of the unmachined workpiece Wb. However, if the machined workpiece Wa and the unmachined workpiece Wb are collected and released simultaneously, then the workpiece exchange can be performed quicker. With regard to this aspect, the above embodiment is preferable.

In the above embodiment, a support shaft 110 is provided that supports the gripping arm 31 such that its central axis 110a has the same turn axis as the gripping arm 31, and that turns and moves linearly together with the gripping arm 31. That is to say, a case was explained in which the first cam mechanism 140 and the second cam mechanism 150 drive the gripping arm 31 via the support shaft 110, but there is no limitation to this. For example, a configuration is also possible, in which the first cam mechanism 140 and the second cam mechanism 150 directly drive the gripping arm 31.

Moreover, in the housing 130 of the cam unit 100 in the above embodiment, the first cam mechanism 140 and the second cam mechanism 150 are driven when the drive shaft 120 rotates. That is to say, the first cam mechanism 140 and the second cam mechanism 150 have the same driving source, but there is no limitation to this. For example, it is also possible to provide the first cam mechanism 140 and the second cam mechanism 150 with separate driving sources. However, if the driving force from a single driving shaft 120 is transmitted to the first cam mechanism 140 and the second cam mechanism 150, then the configuration of the cam unit 100 becomes simpler, so that the housing 130 can be made more compact. Moreover, it becomes easier to synchronize the driving of the first cam mechanism 140 with the driving of the second cam mechanism 150, so that the workpiece can be exchanged even quicker.

Moreover, in the above embodiment, the first cam mechanism 140 includes a roller gear cam 141 that is supported by a drive shaft 120 and is rotatable together with that drive shaft 120, as well as first cam followers 142 that are supported by the support shaft 110 via the turret 143. On the other hand, the second cam mechanism 150 includes a groove cam 151 that is supported by the drive shaft 120 and that is rotatable together with the drive shaft 120, a second cam follower 152 that engages with the groove cam 151, a pivot arm 153 that is provided at one longitudinal end section with the second cam follower 152, and a biasing member 160 that biases the support shaft 110 as the pivot arm 153 pivots. However, there is no limitation to this, and as long as the cam unit 100 includes a cam mechanism that turns the support shaft 110 around the central axis 110a of the support shaft 110 and a cam mechanism that linearly moves the support shaft 110 in the axial direction of its central axis 110a, there is no limitation to its use.

Moreover, in the above embodiment, the biasing member 160 includes a tubular section 161 fitted with the small diameter section 112 of the support shaft 110, and an engagement section 162 having an engagement groove 163 engaging with the protrusion section 153a of the pivot arm 153. That is to say, the biasing member 160 according to the above embodiment is supported by the support shaft 110, and as the pivot arm 153 pivots, it moves linearly together with the support shaft 110, but there is no limitation to this. For example, the biasing member may also be provided near the support shaft 110 and bias the support shaft 110 by moving linearly in a direction parallel to the central axis 110a of the support shaft 110. Such a biasing member may include an engagement section for engaging the support shaft 110, so that when the biasing member moves linearly, the engagement section is biased such that the support shaft 110 moves linearly. However, if such a biasing member is used, the housing 130 needs to be made larger by the amount that the biasing member is removed from the support shaft 110. By contrast, with the biasing member 160 according to the present embodiment, the biasing member 160 is formed in one piece with the support shaft 110, so that the space for attaching the biasing member 160 is made small. As a result, it becomes easy to make the housing 130 more compact, so that the above-described embodiment is preferable.

Moreover, in the above embodiment, with respect to the X-axis direction, the standby position is closer to the workpiece exchange position than the workpiece withdrawal position. That is to say, a case has been explained in which the distance St1 in Graph B in FIG. 11 is shorter than the distance St2, but there is no limitation to this. For example, it is also possible that, with respect to the X-axis direction, the standby position and the workpiece withdrawal position are at the same position, and the distance St1 and the distance St2 have the same length.

The shorter the linear movement distance of the gripping arm 31 is, the quicker the workpiece exchange can be performed. However, when the arm 31 turns while gripping a machined workpiece Wa and an unmachined workpiece Wb, it is necessary to adjust the linear movement distance to a distance where there is no interference between the machined workpiece Wa and the unmachined workpiece Wb on the one hand and the housing 130 on the other hand. However, it is possible to make the linear movement distance in the case that the gripping arm 31 is moved linearly in a state in which it does not grip the machined workpiece Wa and the unmachined workpiece Wb shorter than the distance in which there occurs no interference. Thus, by differentiating for the linear movement distance between cases in which the gripping arm 31 grips a machined workpiece Wa and an unmachined workpiece Wb, and cases in which the gripping arm 31 does not grip a machined workpiece Wa and an unmachined workpiece Wb, it is possible to let the gripping arm 31 move linearly more efficiently. As a result, the workpiece can be exchanged quicker, so that with regard to this aspect, the above embodiment is preferable.

When the gripping arm 31 in the above embodiment reaches the workpiece handover position during the third linear movement operation, it is withdrawn by only the distance St3 from the workpiece handover position, then advanced towards the workpiece handover position, and again reaches the workpiece handover position. However, there is no limitation to this, and it is also possible that once the gripping arm 31 reaches the workpiece handover position during the third linear movement operation, it remains in the workpiece handover position without being retracted. However, if the gripping arm 31 is moved back and forth by the distance St3 after reaching the workpiece handover position as described above, positional shifts of the unmachined workpiece Wb that occur when the unmachined workpiece Wb comes into contact with the lathe-side chuck 21a are reduced, and the unmachined workpiece Wb is positioned at a suitable position. With regards to this aspect, the above-described embodiment is preferable.

What is claimed is:

1. A workpiece exchanging apparatus for exchanging a machined workpiece with an unmachined workpiece, the workpiece exchanging apparatus comprising:
    a gripping arm provided at its two longitudinal end sections with gripping sections for gripping, respectively, a machined workpiece and an unmachined workpiece, the gripping arm being able to turn around a turn axis that is positioned at a longitudinal center section of the gripping arm and being able to move linearly in the axial direction of that turn axis;
    a first cam mechanism for making the gripping arm turn; and
    a second cam mechanism for making the gripping arm linearly move;
    wherein the gripping arm performs:
        an operation in which the gripping arm moves linearly from a standby position of the gripping arm to a workpiece handover position for handing over the machined workpiece and the unmachined workpiece, in order for the gripping sections to grip the machined workpiece and the unmachined workpiece;
        an operation in which the gripping arm moves linearly from the workpiece handover position to a workpiece withdrawal position for withdrawing the machined workpiece and the unmachined workpiece received at the workpiece handover position;
        an operation in which the gripping arm turns such that the positions of the machined workpiece and the unmachined workpiece gripped by the gripping sections are swapped;
        an operation in which the gripping arm moves linearly from the workpiece withdrawal position to the workpiece handover position, in order for the gripping sections to release the machined workpiece and the unmachined workpiece; and
        an operation in which the gripping arm moves linearly in order to return from the workpiece handover position to the standby position; and
    the workpiece exchanging apparatus further comprising:
        a support shaft supporting the gripping arm such that the central axis of the support shaft coincides with the turn axis,
        the support shaft turning around the central axis together with the gripping arm and moving linearly in the axial direction of the central axis together with the gripping arm.

2. A workpiece exchanging apparatus according to claim 1, further comprising:
    a rotatably supported drive shaft, the drive shaft driving the first cam mechanism and the second cam mechanism by rotating, and
    a housing containing the first cam mechanism, the second cam mechanism, the support shaft, and the drive shaft.

3. A workpiece exchanging apparatus according to claim 2, wherein the first cam mechanism includes:
    a first cam that is supported by the drive shaft and that can rotate together with the drive shaft; and
    a first cam follower that is supported by the support shaft and that makes the support shaft turn by engaging with the first cam as the first cam rotates; and
    wherein the second cam mechanism includes:
    a second cam that is supported by the drive shaft together with the first cam and that can rotate together with the drive shaft; and
    a pivot arm that has at one end section in its longitudinal direction a second cam follower that engages with the second cam and that is pivotable by the rotation of the second cam; and
    a biasing member that engages with the other longitudinal end section of the pivot arm and that biases the support shaft to cause the support shaft to move linearly as the pivot arm pivots.

4. A workpiece exchanging apparatus according to claim 3, wherein the biasing member includes:
    a tubular section that makes a small diameter section of the support shaft fit inside thereof; and
    an engagement section adjacent to that end section that is further removed from the gripping arm, of the two longitudinal end sections of the tubular section, and having an engagement hole for engaging with the other longitudinal end section of the pivot arm; and
    when the pivot arm pivots, the tubular section biases the support shaft as the engagement section and the tubular section move linearly in the axial direction of the central axis of the support shaft.

5. A workpiece exchanging apparatus according to claim 1, wherein, with respect to the linear movement direction of the gripping arm, the standby position is closer to the workpiece handover position than the workpiece withdrawal position.

6. A workpiece exchanging apparatus according to claim 1, wherein, when the gripping arm reaches the workpiece handover position during the operation in which the gripping arm moves linearly in order to return from the workpiece withdrawal position to the workpiece handover position, the gripping arm first retracts from the workpiece handover position, and then the gripping arm advances towards the workpiece handover position and again reaches the workpiece handover position.

7. A lathe unit comprising:
(A) a lathe for machining a workpiece; and
(B) a workpiece exchanging apparatus for exchanging a machined workpiece that has been machined with the lathe with an unmachined workpiece, the workpiece exchanging apparatus including:
    a gripping arm provided at its two longitudinal end sections with gripping sections for gripping, respectively, a machined workpiece and an unmachined workpiece, the gripping arm being able to turn around a turn axis that is positioned at a longitudinal center section of the gripping arm and being able to move linearly in the axial direction of that turn axis;

a first cam mechanism for making the gripping arm turn; and a second cam mechanism for making the gripping arm linearly move;

wherein the gripping arm performs:

an operation in which the gripping arm moves linearly from a standby position of the gripping arm to a workpiece handover position for handing over the machined workpiece and the unmachined workpiece, in order for the gripping sections to grip the machined workpiece and the unmachined workpiece;

an operation in which the gripping arm moves linearly from the workpiece handover position to a workpiece withdrawal position for withdrawing the machined workpiece and the unmachined workpiece received at the workpiece handover position;

an operation in which the gripping arm turns such that the positions of the machined workpiece and the unmachined workpiece gripped by the gripping sections are swapped;

an operation in which the gripping arm moves linearly from the workpiece withdrawal position to the workpiece handover position, in order for the gripping sections to release the machined workpiece and the unmachined workpiece; and an operation in which the gripping arm moves linearly in order to return from the workpiece handover position to the standby position; and the workpiece exchanging apparatus further comprising:

a support shaft supporting the gripping arm such that the central axis of the support shaft coincides with the turn axis, the support shaft turning around the central axis together with the gripping arm and moving linearly in the axial direction of the central axis together with the gripping arm.

8. A cam unit comprising:

a first cam mechanism for making a support shaft turn;

a second cam mechanism for making the support shaft linearly move;

a rotatably supported drive shaft, the drive shaft driving the first cam mechanism and the second cam mechanism by rotating;

a housing containing the first cam mechanism, the second cam mechanism, the support shaft, and the drive shaft, wherein the first cam mechanism includes:

a first cam that is supported by the drive shaft and that can rotate together with the drive shaft; and a first cam follower that is supported by the support shaft and that makes the support shaft turn by engaging with the first dam as the first cam rotates; and wherein the second cam mechanism includes:

a second cam that is supported by the drive shaft together with the first cam and that can rotate together with the drive shaft; and a pivot arm that has at one end section in its longitudinal direction a second cam follower that engages with the second cam and that is pivotable by the rotation of the second cam; and a biasing member that engages with the other longitudinal end section of the pivot arm and that biases the support shaft to cause the support shaft to move linearly as the pivot arm pivots, wherein the biasing member includes:

a tubular section that makes a small diameter section of the support shaft fit inside thereof, the small diameter section turning with respect to the tubular section; and an engagement section adjacent to that end section that is further removed from gripping arm, of the two longitudinal end sections of the tubular section, and having an engagement hole of the engaging with the other longitudinal end section of the pivot arm and;

a sliding section that has a through hole for passing a slide shaft fixed to the housing, and prevents turning of the biasing member, when the pivot arm pivots, the tubular section biases the support shaft as the engagement section and the tubular section move linearly in the axial direction of the central axis of the support shaft.

* * * * *